US011140255B2

(12) United States Patent
Seo et al.

(10) Patent No.: US 11,140,255 B2
(45) Date of Patent: Oct. 5, 2021

(54) MESSAGING CLIENT APPLICATION INTERFACE

(71) Applicant: DROPBOX INC., San Francisco, CA (US)

(72) Inventors: Kijun Seo, San Francisco, CA (US); Anthony DeVincenzi, San Francisco, CA (US); George Milton Underwood, IV, Palo Alto, CA (US); Sean Beausoleil, Mountain View, CA (US); Darian Edwards, Portland, OR (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/644,672

(22) Filed: Jul. 7, 2017

(65) Prior Publication Data

US 2017/0310813 A1    Oct. 26, 2017

Related U.S. Application Data

(63) Continuation of application No. 14/248,272, filed on Apr. 8, 2014, now Pat. No. 9,729,695, which is a
(Continued)

(51) Int. Cl.
*G06F 3/0486* (2013.01)
*G06F 3/0482* (2013.01)
(Continued)

(52) U.S. Cl.
CPC ...... *H04M 1/72436* (2021.01); *G06F 3/0481* (2013.01); *G06F 3/0482* (2013.01);
(Continued)

(58) Field of Classification Search
CPC .......... H04M 1/72552; H04M 1/72436; G06F 3/0482; G06F 3/0486; G06F 3/04883;
(Continued)

(56) References Cited

U.S. PATENT DOCUMENTS 5,283,560 A * 2/1994 Bartlett ................. G06F 3/0481
345/902
5,754,178 A 5/1998 Johnston et al.
(Continued)

FOREIGN PATENT DOCUMENTS

AU       2011253700    12/2011
CA        2746065      10/2011
(Continued)

OTHER PUBLICATIONS

Author: Randy Nordell Title: Making Outlook Work For You—Outlook Follow Up Flags Date: Nov. 2, 2011 pp. 1-5 (Year: 2011).*
(Continued)

*Primary Examiner* — Kavita Stanley
*Assistant Examiner* — Phoebe X Pan
(74) *Attorney, Agent, or Firm* — DLA Piper LLP (US)

(57) ABSTRACT

A user interface for a messaging client application can include a message list. By executing various input operations on a representation of a message in the message list, the user can take an action on the message. For example, a user operating a pointing device can perform a drag operation on a representation of the message in the message list, and the action to be taken on the message can be indicated by the direction and distance of the drag. Visual feedback can be provided during the drag operation to indicate the action that will be taken if the user ends the drag at the current location.

19 Claims, 34 Drawing Sheets

Related U.S. Application Data continuation-in-part of application No. 14/056,838, filed on Oct. 17, 2013, now Pat. No. 9,654,426.

(60) Provisional application No. 61/728,626, filed on Nov. 20, 2012.

(51) Int. Cl.
| | | |
|---|---|---|
| *G06F 3/0488* | (2013.01) | |
| *G06F 3/0481* | (2013.01) | |
| *H04L 12/58* | (2006.01) | |
| *H04M 1/72436* | (2021.01) | |
| G06F 3/0484 | (2013.01) | |

(52) U.S. Cl.
CPC ........ *G06F 3/0486* (2013.01); *G06F 3/04883* (2013.01); *G06F 3/04886* (2013.01); *G06F 3/0484* (2013.01); *G06F 3/0488* (2013.01); *H04L 51/00* (2013.01)

(58) Field of Classification Search
CPC .. G06F 3/04886; G06F 3/0481; G06F 3/0484; G06F 3/0488; H04L 51/00
See application file for complete search history.

(56) References Cited

U.S. PATENT DOCUMENTS

| | | | |
|---|---|---|---|
| 5,760,773 A * | 6/1998 | Berman | G06F 1/1626 345/672 |
| 5,822,526 A | 10/1998 | Waskiewicz | |
| 6,411,684 B1 | 6/2002 | Cohn et al. | |
| 6,545,669 B1 | 4/2003 | Kinawi et al. | |
| 6,941,348 B2 | 9/2005 | Petry et al. | |
| 7,305,242 B2 * | 12/2007 | Zakharia | G06F 3/04812 455/411 |
| 7,363,345 B2 | 4/2008 | Austin-Lane et al. | |
| 7,505,571 B2 | 3/2009 | Bhatia et al. | |
| 7,525,571 B2 | 4/2009 | Ando et al. | |
| 7,525,691 B2 | 4/2009 | Gordon et al. | |
| 7,730,081 B2 | 6/2010 | Bromm et al. | |
| 7,788,218 B2 | 8/2010 | Gerritsen et al. | |
| 7,818,672 B2 * | 10/2010 | McCormack | G06F 3/048 715/708 |
| 7,886,236 B2 | 2/2011 | Kolmykov-Zotov | |
| 7,895,537 B2 | 2/2011 | Gruen | |
| 7,899,869 B1 * | 3/2011 | Anderson | G06Q 10/10 709/206 |
| 7,934,156 B2 * | 4/2011 | Forstall | H04M 1/2747 715/255 |
| 8,005,462 B2 | 8/2011 | Roy | |
| 8,019,863 B2 | 9/2011 | Jeide et al. | |
| 8,054,294 B2 | 11/2011 | Sakai et al. | |
| 8,250,159 B2 | 8/2012 | Starbuck et al. | |
| 8,255,468 B2 | 8/2012 | Vitaldevara et al. | |
| 8,291,349 B1 | 10/2012 | Park | |
| 8,316,095 B1 | 11/2012 | Nguyen | |
| 8,390,577 B2 | 3/2013 | LeMort | |
| 8,438,495 B1 | 5/2013 | Gilra et al. | |
| 8,451,246 B1 | 5/2013 | Scholler | |
| 8,610,682 B1 * | 12/2013 | Fulcher | G06F 3/0482 345/173 |
| 8,624,864 B2 * | 1/2014 | Birnbaum | G06F 3/016 340/407.2 |
| 8,635,561 B1 | 1/2014 | Bullock et al. | |
| 8,645,863 B2 * | 2/2014 | Mandic | G06F 3/0482 715/813 |
| 8,775,520 B1 | 7/2014 | Lewis et al. | |
| 8,787,335 B2 | 7/2014 | Smith et al. | |
| 8,793,591 B1 | 7/2014 | Coleman et al. | |
| 8,782,566 B2 | 8/2014 | Sarkar | |
| 8,836,147 B2 | 9/2014 | Uno et al. | |
| 8,839,147 B2 | 9/2014 | Kang | |
| 8,910,068 B2 | 12/2014 | Shin | |
| 9,063,989 B2 | 6/2015 | Buchheit et al. | |
| 9,244,594 B2 * | 1/2016 | Jiang | G06F 3/04883 |
| 9,248,376 B2 | 2/2016 | Yoshikawa et al. | |
| 9,360,998 B2 | 6/2016 | Bauder | |
| 9,507,448 B2 * | 11/2016 | Park | G06F 3/041 |
| 9,542,668 B2 | 1/2017 | Gilad et al. | |
| 10,025,461 B2 * | 7/2018 | Liu | G06F 3/04883 |
| 10,033,679 B2 | 7/2018 | Gilad et al. | |
| 10,402,050 B2 * | 9/2019 | Lee | G06F 3/0482 |
| 10,788,953 B2 | 9/2020 | Chaudhri et al. | |
| 2001/0042087 A1 | 11/2001 | Kephart et al. | |
| 2002/0054117 A1 | 5/2002 | Van et al. | |
| 2002/0087704 A1 | 7/2002 | Chesnais et al. | |
| 2003/0020687 A1 | 1/2003 | Sowden et al. | |
| 2004/0119763 A1 | 6/2004 | Mizobuchi et al. | |
| 2005/0015432 A1 | 1/2005 | Cohen | |
| 2005/0043015 A1 | 2/2005 | Muramatsu | |
| 2005/0068971 A1 | 3/2005 | Meisl et al. | |
| 2005/0081059 A1 | 4/2005 | Bandini et al. | |
| 2005/0114781 A1 | 5/2005 | Brownholtz et al. | |
| 2005/0144568 A1 * | 6/2005 | Gruen | G06F 3/04883 715/822 |
| 2005/0181768 A1 | 8/2005 | Roy | |
| 2005/0192924 A1 | 9/2005 | Drucker et al. | |
| 2005/0275638 A1 | 12/2005 | Kolmykov | |
| 2006/0085391 A1 * | 4/2006 | Turski | G06F 16/907 |
| 2006/0090137 A1 | 4/2006 | Cheng et al. | |
| 2006/0123360 A1 * | 6/2006 | Anwar | G06F 3/0482 715/810 |
| 2006/0155810 A1 | 7/2006 | Butcher | |
| 2006/0179415 A1 | 8/2006 | Cadiz et al. | |
| 2006/0190830 A1 | 8/2006 | Gerstl et al. | |
| 2006/0206570 A1 | 9/2006 | Heidloff et al. | |
| 2006/0238517 A1 | 10/2006 | King et al. | |
| 2007/0038707 A1 | 2/2007 | Broder et al. | |
| 2007/0076857 A1 | 4/2007 | Chava et al. | |
| 2007/0192708 A1 | 8/2007 | Lee et al. | |
| 2007/0229465 A1 | 10/2007 | Sakai et al. | |
| 2007/0277125 A1 | 11/2007 | Shin et al. | |
| 2008/0059570 A1 | 3/2008 | Sarafijanovic et al. | |
| 2008/0074399 A1 | 3/2008 | Lee | |
| 2008/0094371 A1 * | 4/2008 | Forstall | G06F 3/04883 345/173 |
| 2008/0126481 A1 | 5/2008 | Chakra et al. | |
| 2008/0165145 A1 | 7/2008 | Herz | |
| 2008/0165160 A1 | 7/2008 | Kocienda et al. | |
| 2008/0201668 A1 | 8/2008 | Roy | |
| 2008/0208980 A1 | 8/2008 | Champan et al. | |
| 2008/0220798 A1 | 9/2008 | Potluri et al. | |
| 2008/0222540 A1 | 9/2008 | Schultz et al. | |
| 2008/0222546 A1 * | 9/2008 | Mudd | G06F 17/30749 715/765 |
| 2008/0256179 A1 | 10/2008 | Gorty et al. | |
| 2008/0270548 A1 | 10/2008 | Glickstein et al. | |
| 2008/0294735 A1 | 11/2008 | Muntermann et al. | |
| 2009/0007012 A1 * | 1/2009 | Mandic | G06F 3/0482 715/810 |
| 2009/0076966 A1 | 3/2009 | Sun | |
| 2009/0079699 A1 | 3/2009 | Sun | |
| 2009/0093277 A1 | 4/2009 | Lee | |
| 2009/0150905 A1 | 6/2009 | Lin et al. | |
| 2009/0157831 A1 | 6/2009 | Tian et al. | |
| 2009/0172695 A1 | 7/2009 | Lazaroff et al. | |
| 2009/0178078 A1 | 7/2009 | Herz | |
| 2009/0233618 A1 | 9/2009 | Bai et al. | |
| 2009/0244015 A1 | 10/2009 | Sengupta et al. | |
| 2009/0254624 A1 | 10/2009 | Baudin et al. | |
| 2009/0276701 A1 | 11/2009 | Nurmi | |
| 2009/0278806 A1 | 11/2009 | Duarte | |
| 2009/0282360 A1 | 11/2009 | Park et al. | |
| 2009/0307623 A1 | 12/2009 | Agarawala et al. | |
| 2009/0313567 A1 | 12/2009 | Kwon et al. | |
| 2010/0013780 A1 * | 1/2010 | Ikeda | G06F 3/04883 345/173 |
| 2010/0031202 A1 | 2/2010 | Morris | |
| 2010/0070594 A1 | 3/2010 | Yoshimura | |
| 2010/0082759 A1 * | 4/2010 | Nalliah | H04L 51/38 709/206 |
| 2010/0095249 A1 | 4/2010 | Yoshikawa et al. | |

(56) References Cited

U.S. PATENT DOCUMENTS

| | | | |
|---|---|---|---|
| 2010/0125786 A1 | 5/2010 | Ozawa et al. | |
| 2010/0153493 A1 | 6/2010 | Clarke | |
| 2010/0177051 A1 | 7/2010 | Bilow | |
| 2010/0199226 A1 | 8/2010 | Numi | |
| 2010/0210214 A1 | 8/2010 | Pawar et al. | |
| 2010/0214237 A1 | 8/2010 | Echeverri et al. | |
| 2010/0235794 A1 | 9/2010 | Ording | |
| 2010/0241973 A1 | 9/2010 | Whiddett | |
| 2010/0257241 A1 | 10/2010 | Hale et al. | |
| 2010/0295805 A1 | 11/2010 | Shin | |
| 2010/0299599 A1* | 11/2010 | Shin | G06F 3/0482 715/702 |
| 2010/0299638 A1 | 11/2010 | Choi | |
| 2011/0004662 A1 | 1/2011 | Dodsworth | |
| 2011/0010672 A1* | 1/2011 | Hope | G06F 3/0486 715/841 |
| 2011/0022471 A1 | 1/2011 | Brueck et al. | |
| 2011/0074828 A1 | 3/2011 | Capela | |
| 2011/0081923 A1 | 4/2011 | Forutanpour et al. | |
| 2011/0084921 A1* | 4/2011 | Kang | H04M 1/72552 345/173 |
| 2011/0099507 A1* | 4/2011 | Nesladek | G01C 21/265 715/780 |
| 2011/0106880 A1 | 5/2011 | Strong et al. | |
| 2011/0163970 A1 | 7/2011 | Lemay | |
| 2011/0197153 A1 | 8/2011 | King et al. | |
| 2011/0202616 A1 | 8/2011 | Kinoshita | |
| 2011/0202878 A1* | 8/2011 | Park | G06F 3/04817 715/825 |
| 2011/0202879 A1* | 8/2011 | Stovicek | G06F 3/0482 715/828 |
| 2011/0209098 A1 | 8/2011 | Hinckley et al. | |
| 2011/0209195 A1 | 8/2011 | Kennedy et al. | |
| 2011/0219332 A1* | 9/2011 | Park | G06F 3/0482 715/808 |
| 2011/0289162 A1 | 11/2011 | Schlossnagle | |
| 2011/0295958 A1 | 12/2011 | Liu et al. | |
| 2011/0296351 A1 | 12/2011 | Ewing, Jr. et al. | |
| 2011/0302515 A1 | 12/2011 | Kim | |
| 2012/0023375 A1 | 1/2012 | Dutta et al. | |
| 2012/0030407 A1 | 2/2012 | Pandey et al. | |
| 2012/0124147 A1 | 5/2012 | Bayer | |
| 2012/0131458 A1 | 5/2012 | Hays | |
| 2012/0131474 A1 | 5/2012 | Panchadsaram et al. | |
| 2012/0131659 A1 | 5/2012 | Roy et al. | |
| 2012/0161458 A1 | 6/2012 | Sim | |
| 2012/0185781 A1 | 7/2012 | Lemay | |
| 2012/0185797 A1 | 7/2012 | Halchin | |
| 2012/0210214 A1 | 8/2012 | Yoo et al. | |
| 2012/0210334 A1 | 8/2012 | Sutedja et al. | |
| 2012/0240054 A1 | 9/2012 | Webber | |
| 2012/0254793 A1 | 10/2012 | Briand et al. | |
| 2012/0256863 A1 | 10/2012 | Zhang | |
| 2012/0290662 A1* | 11/2012 | Weber | G06Q 10/107 709/206 |
| 2012/0290946 A1* | 11/2012 | Schrock | G06Q 10/107 715/752 |
| 2012/0304074 A1 | 11/2012 | Ooi et al. | |
| 2013/0007150 A1* | 1/2013 | Hertz | H04L 51/32 709/206 |
| 2013/0019174 A1* | 1/2013 | Gil | G06F 3/04812 715/711 |
| 2013/0024780 A1 | 1/2013 | Sutedja et al. | |
| 2013/0035123 A1 | 2/2013 | Smith et al. | |
| 2013/0050118 A1 | 2/2013 | Kjelsbak et al. | |
| 2013/0050131 A1* | 2/2013 | Lee | G08G 1/09626 345/174 |
| 2013/0057902 A1 | 3/2013 | Henry et al. | |
| 2013/0067392 A1 | 3/2013 | Leonard et al. | |
| 2013/0072263 A1 | 3/2013 | Kim | |
| 2013/0097566 A1 | 4/2013 | Berglund | |
| 2013/0100036 A1 | 4/2013 | Papakipos | |
| 2013/0104089 A1 | 4/2013 | Rieffel et al. | |
| 2013/0117713 A1 | 5/2013 | Bauder | |
| 2013/0125063 A1 | 5/2013 | Lee et al. | |
| 2013/0132904 A1 | 5/2013 | Primiani et al. | |
| 2013/0145303 A1 | 6/2013 | Prakash | |
| 2013/0167082 A1 | 6/2013 | Joo et al. | |
| 2013/0174089 A1* | 7/2013 | Ki | G06F 3/0482 715/810 |
| 2013/0179517 A1 | 7/2013 | Grosu et al. | |
| 2013/0179801 A1 | 7/2013 | Audet et al. | |
| 2013/0185650 A1 | 7/2013 | Gutowitz | |
| 2013/0204946 A1 | 8/2013 | Forstall et al. | |
| 2013/0205220 A1* | 8/2013 | Yerli | H04L 67/36 715/748 |
| 2013/0212529 A1* | 8/2013 | Amarnath | G06F 3/0482 715/810 |
| 2013/0227483 A1* | 8/2013 | Thorsander | G06F 3/0482 715/821 |
| 2013/0238651 A1* | 9/2013 | Benedek | G06F 3/0488 707/769 |
| 2013/0246975 A1 | 9/2013 | Oddiraju et al. | |
| 2013/0290876 A1 | 10/2013 | Anderson et al. | |
| 2013/0290879 A1 | 10/2013 | Greisson | |
| 2013/0324222 A1 | 12/2013 | De Viveiros Ortiz | |
| 2013/0332850 A1* | 12/2013 | Bovet | H04L 51/22 715/752 |
| 2014/0007005 A1* | 1/2014 | Libin | G06F 3/0485 715/784 |
| 2014/0028585 A1* | 1/2014 | Park | G06F 3/0488 345/173 |
| 2014/0035826 A1* | 2/2014 | Frazier | G06F 3/0482 345/173 |
| 2014/0123043 A1 | 5/2014 | Schmidt et al. | |
| 2014/0129942 A1 | 5/2014 | Rathod | |
| 2014/0143358 A1 | 5/2014 | Beausoleil et al. | |
| 2014/0143683 A1 | 5/2014 | Underwood, IV et al. | |
| 2014/0143738 A1 | 5/2014 | Underwood, IV et al. | |
| 2014/0157182 A1 | 6/2014 | Kim | |
| 2014/0165003 A1* | 6/2014 | Branton | G06F 3/0488 715/835 |
| 2014/0165012 A1 | 6/2014 | Shen | |
| 2014/0223347 A1 | 8/2014 | Seo | |
| 2014/0278786 A1 | 9/2014 | Liu-Qiu-Yan | |
| 2014/0282005 A1 | 9/2014 | Gutowitz | |
| 2014/0282254 A1* | 9/2014 | Feiereisen | G06F 3/04883 715/835 |
| 2014/0304615 A1 | 10/2014 | Coe et al. | |
| 2014/0317545 A1 | 10/2014 | Miyazaki | |
| 2014/0325425 A1* | 10/2014 | Milam | G06F 3/0482 715/777 |
| 2015/0032829 A1 | 1/2015 | Barshow et al. | |
| 2015/0046867 A1* | 2/2015 | Moore | G06F 3/0416 715/781 |
| 2015/0067596 A1* | 3/2015 | Brown | G06F 3/0416 715/808 |
| 2015/0112749 A1 | 4/2015 | Erdal | |
| 2015/0135337 A1 | 5/2015 | Fushman et al. | |
| 2015/0169068 A1 | 6/2015 | Plagemann et al. | |
| 2015/0277717 A1 | 10/2015 | Barabash et al. | |
| 2015/0281156 A1* | 10/2015 | Beausoleil | H04L 51/14 709/206 |
| 2016/0026704 A1 | 1/2016 | Strong et al. | |
| 2016/0274747 A1 | 9/2016 | Bauder | |
| 2016/0328097 A1* | 11/2016 | In | G06F 3/0482 |
| 2018/0173318 A1 | 6/2018 | Kim et al. | |

FOREIGN PATENT DOCUMENTS

| | | |
|---|---|---|
| CN | 101273591 | 9/2008 |
| CN | 101641946 | 2/2010 |
| CN | 101796478 | 8/2010 |
| CN | 102495692 | 6/2012 |
| EP | 1942401 | 7/2008 |
| EP | 2116927 | 11/2009 |
| EP | 2362592 A1 | 8/2011 |
| EP | 2055059 | 10/2012 |
| JP | 2004-303207 | 10/2004 |
| JP | 2009-151638 A | 7/2009 |
| JP | 2010-525740 A | 7/2010 |

(56) References Cited

FOREIGN PATENT DOCUMENTS

| JP | 2011-188327 A | 9/2011 |
|---|---|---|
| JP | 2012-038292 A | 2/2012 |
| WO | 01/63875 A2 | 8/2001 |
| WO | 2008/030970 | 3/2008 |
| WO | 2012/068401 A1 | 5/2012 |
| WO | 2012/068407 | 5/2012 |
| WO | 2013009092 | 1/2013 |
| WO | 2013009092 | 4/2013 |
| WO | 2014/081863 A1 | 5/2014 |
| WO | 2014/081870 A2 | 5/2014 |

OTHER PUBLICATIONS

Tsai, Henry, "Getting Started on Astrid's "Remind Me" Gmail Integration," Astrid.com, [online], Feb. 11, 2013, [retrieved on Jan. 3, 2013], retrieved from the internet: <URL: http://biog.astrid.comNog/2013/02111/getting-started-onastrids-remind-me-extension>, 5 pages.

Klinker, Jacob, "Sliding Messaging Pro," 2013, [online], [retrieved on May 13, 2013], retrieved from the internet <URL:https://play.google.com/store/apps/details?id=com.klinkerandroid>, 3 pages.

Author: Guiding Tech Title: Hold Mouse Right Button for More Options On Drag and Drop Date: Jul. 1, 2012 pp. 1-6.

"Triage: Email First Aid," 2013, [online], [retrieved on May 13, 2013], retrieved from the internet <URL: https://www.triage.cc/>, 2 pages.

"Taskbox: Emails & Task Lists Rolled Into One," posted Apr. 22, 2013 by Jesse Virgil, [online], [retrieved on Jan. 3, 2014], retrieved from the internet <URL: http://iphone.appstorm.net/reviews/productivity/taskbox-emails-task-lists-rolled-into-one/>, 12 pages.

"Taskbox—Mail," 2013, [online], [retrieved on May 13, 2013], retrieved from the internet <URL: https://itunes.apple.com/us/app/taskbox-mail>, 3 pages.

"Orchestra To-do," 2013, [online], [retrieved on May 13, 2013], retrieved from the internet <URL: https://itunes.apple.com/us/app/orchestra-to-do>, 3 pages.

"Move Over Mailbox, Taskbox Is Better for US Working Folks," Mar. 9, 2013, Niblitz.com, [online], [retrieved on Jan. 3, 2014], retrieved from the internet <URL: http://nibletz.com/2013/03/09/move-mailbox-taskbox-working-folks>, 2 pages.

"Browse through your email more efficiently with Swipe For Mail," posted Feb. 19, 2012 by Cody Lee, [online], [retrieved on May 13, 2013], retrieved from the internet <URL:http://www.idownloadblog.com/2012/02/19/swipemail-iailbreak-tweak/>, 5 pages.

"Activator: a free and extremely powerful jailbreak app launcher for iPhone," posted Feb. 1, 2010 by Thomas Wong, iSource.com, [online], [retrieved on May 13, 2013], retrieved from the internet <URL: http://isource.com/2010/02/01/activator-a-free-and-extremely-powerful>, 5 pages.

"[Quick Tip] Hold Mouse Right Button for More Options On Drag and Drop," Guiding Tech, Jul. 1, 2012, [online], <URL: http://www.guidingtech.com/12504/hold-mouse-right-button-more-drag- drop-options/>, 6 pages.

Rana, "Pinch-to-Pinch, Swipe To Delete Features Coming to Gmail for Android", iGyaan Network, dated Oct. 13, 2012, 7 pages.

Nishihata, et al., "jQuery Mobile, smartphone site design introductory", ASCII Media Works Inc., Sep. 13, 2012, pp. 116-117.

Communication pursuant to Article 94(3) EPC for European Application No. 13805647.8 dated Oct. 30, 2019, 18 pages.

Office Action for U.S. Appl. No. 15/486,285 dated Dec. 19, 2019, 14 pages.

Advisory Action from U.S. Appl. No. 15/486,285, dated Oct. 2, 2019, 3 pages.

Extended European Search Report for EP Application No. 19152886.8 dated Jun. 17, 2019, 9 pages.

International Preliminary Report on Patentability for PCT Application No. PCT/US13/71066, dated Jun. 4, 2015, 12 pages.

International Preliminary Report on Patentability for PCT Application No. PCT/US13/71074, dated Jun. 4, 2015, 10 pages.

International Search Report and Written Opinion for PCT Application No. PCT/US13/71066, dated Mar. 18, 2014, 14 pages.

International Search Report and Written Opinion for PCT Application No. PCT/US2013/071074, dated Aug. 13, 2014, 15 pages.

Invitation to Pay Fees and Partial International Search Report for PCT Application No. PCT/US2013/071074, dated Feb. 17, 2014, 7 pages.

Office Action for U.S. Appl. No. 14/056,838 dated Jul. 8, 2014, 18 pages.

Office Action for U.S. Appl. No. 14/056,838 dated May 8, 2015, 15 pages.

Office Action for U.S. Appl. No. 14/056,850 dated Nov. 9, 2015, 24 pages.

Office Action for U.S. Appl. No. 14/077,160 dated Jul. 24, 2015, 23 pages.

Office Action for U.S. Appl. No. 14/155,304 dated Sep. 24, 2015, 25 pages.

Office Action for U.S. Appl. No. 14/248,272 dated Jun. 19, 2014, 20 pages.

Advisory Action from U.S. Appl. No. 15/486,285, dated Aug. 24, 2020, 3 pages.

Communication under Rule 71(3) EPC for European Application No. 13805647.8 dated Jun. 12, 2020, 41 pages.

Final Office Action from U.S. Appl. No. 15/486,285, dated Jun. 24, 2020, 15 pages.

Communication pursuant to Article 94(3) EPC for European Application No. 19152886.8 dated Oct. 19, 2020, 7 pages.

Communication under Rule 94(3) EPC for European Application No. 13805647.8 dated Nov. 3, 2020, 4 pages.

Non-Final Office Action from U.S. Appl. No. 15/486,285, dated Dec. 17, 2020, 15 pages.

Final Office Action from U.S. Appl. No. 15/486,285, dated May 3, 2021, 16 pages.

Communication under Rule 71(3) EPC for European Application No. 13805647.8 dated Jun. 16, 2021, 42 pages.

\* cited by examiner

202

- ✏ Compose
- 📁 Inbox
  - Personal
  - Work
- ⏰ Deferred  208
- 📋 Lists  210
  - To Buy
  - To Read
  - In Progress
- ✅ Archive  212
- ❌ Trash  214
- ✴ Sent  216

🔍 Search  322

Karen                                    12:43 PM
New Product Launch  324a
Are the new help screens ready yet? Phil
wants to see them tomorrow ...

Ted                                      11:07 AM
Lunch?  324b          ↙ 320
I want to try that new Thai place next door.

Phil & Karen      324c                   11:03 AM
Font size not changing             ③
I found the problem; font setting should
now change when you use ...

Ted, Phil, Team & Me   324d              10:59 AM
Friday team meeting                ④
I think we should set aside some time to
brainstorm ideas for ...

Nile Books        324e                   9:22 AM
Save on Books You'll Love
This week only, save 50% on titles by
Franz Kafka & more ...

Phil              324f                   9:14 AM
Training?
Do you have time today to train Suzy on
the new database interface?

240 ↘

☰  ⏰  📁  ✔  ❌   ～ 250

Save on Books You'll Love
Nile Books

Nile Books                           9:22 AM

This week only, save 50% on titles by Franz Kafka
and more!

Ut tincidunt, quam non
    pellentesque ultricies, mi massa
    Kafka       tincidunt lectus, ut accumsan
    The Trial   enim ante in urna.

50%
    OFF!

Fusce ullamcorper neque ac tellus
    Hemingway   cursus facilisis. Aliquam et orci ut
    A Farewell  dolor dictum condimentum ac vel
    to Arms     elit. Aliquam erat volutpat.

50%
    OFF!

[↻] Compose

[📧] Inbox
    Personal
    Work
[⏱] Deferred 208
[≡] Lists 210
    To Buy
    To Read
    In Progress
[✓] Archive 212
[✕] Trash 214
[*] Sent 🔍 Search  _1022_

Karen      12:43 PM
New Product Launch
Are the new help screens ready yet? Phil wants to see them tomorrow ...

Ted      11:07 AM
Lunch? _1024b_
I want to try that new Thai pl~~_1020_~~e next door. _1030_

Phil & Karen      11:03 AM
Font size not changing   [3]
I found the problem; font setting should now change when you use ...

Ted, Phil, Team & Me      10:59 AM
Friday team meeting   [4]
I think we should set aside some time to brainstorm ideas for ...

Nile Books      9:22 AM
Save on Books You'll Love
This week only, save 50% on titles by Franz Kafka & more ...

Phil      9:14 AM
Training?
Do you have time today to train Suzy on the new database interface?

---

Nile Books      9:22 AM
[≡]   [⏱] [📧] [>] [✕]

Save on Books You'll Love
Nile Books

Nile Books
This week only, save 50% on titles by Franz Kafka and more!

| Kafka The Trial |
| 50% OFF! |

Ut tincidunt, quam non pellentesque ultricies, mi massa tincidunt lectus, ut accumsan enim ante in urna.

| Hemingway A Farewell to Arms |
| 50% OFF! |

Fusce ullamcorper neque ac tellus cursus facilisis. Aliquam et orci ut dolor dictum condimentum ac vel elit. Aliquam erat volutpat

Compose

Inbox
- Personal
- Work

Deferred 208

Lists 210
- To Buy
- To Read
- In Progress

Archive 212

Trash 214

Sent

Search  1122

Karen  12:43 PM
New Product Launch
Are the new help screens ready yet? Phil wants to see them tomorrow …

Ted  1124b  11:07 AM
Lunch?  ⟵ 1120
I want to try that new Thai place next door.

1132 1134 1136 1138
1124c  11:03 AM  ✗

Phil & Karen
Font size not changing
I found the problem; font setting should now change when you use …

Ted, Phil, Team & Me  10:59 AM
Friday team meeting  1124d  ④
I think we should set aside some time to brainstorm ideas for …

Nile Books  1124e  9:22 AM
Save on Books You'll Love
This week only, save 50% on titles by Franz Kafka & more …

---

Nile Books  9:22 AM
Save on Books You'll Love
Nile Books

Nile Books
This week only, save 50% on titles by Franz Kafka and more!

Kafka
The Trial

50% OFF!

Hemingway
A Farewell to Arms

Ut tincidunt, quam non pellentesque ultricies, mi massa tincidunt lectus, ut accumsan enim ante in urna.

Fusce ullamcorper neque ac tellus cursus facilisis. Aliquam et orci ut dolor dictum condimentum ac vel elit. Aliquam erat volutpat

50% OFF!

Compose

Inbox
- Personal
- Work

Deferred 208
Lists 210
- To Buy
- To Read
- In Progress

Archive 212
Trash 214
Sent

Search 1522

Karen — 12:43 PM
New Product Launch
Are the new help screens ready yet? Phil 1520
wants to see them tomorrow ...

Ted
Lunch?
I want to try that new Thai place next door. — 1536

1524b

Phil & Karen — 11:03 AM
Font size not changing ③
I found the problem; font setting should
now change when you use ...

Ted, Phil, Team & Me — 10:59 AM
Friday team meeting ④
I think we should set aside some time to
brainstorm ideas for ...

Nile Books — 9:22 AM
Save on Books You'll Love
This week only, save 50% on titles by
Franz Kafka & more ...

Phil — 9:14 AM
Training?
Do you have time today to train Suzy on
the new database interface?

---

Nile Books — 9:22 AM
Save on Books You'll Love
1530

This week only, save 50% on titles by Franz Kafka and more!

Ut tincidunt, quam non pellentesque ultricies, mi massa tincidunt lectus, ut accumsan enim ante in urna.

Kafka
The Trial
50% OFF!

Hemingway
A Farewell to Arms
50% OFF!

Fusce ullamcorper neque ac tellus cursus facilisis. Aliquam et orci ut dolor dictum condimentum ac vel elit. Aliquam erat volutpat

Compose

Inbox
- Personal
- Work
- Deferred 208
- Lists 210
  - To Buy
  - To Read
  - In Progress
- Archive 212
- Trash 214
- Sent Search  1622

Karen                                                    12:43 PM
New Product Launch
Are the new help screens ready yet? Phil
wants to see them tomorrow ....

Ted                          1620              11:07 AM
Lunch?                                        1624b
I want to try that new Thai place next door.

Phil & Karen    ☰ 😊 🖼 ✂    11:03 AM  ③
Font size not changing         1630
I found the problem; font setting
now change when you use ....

Ted, Phil, Team & Me                  10:59 AM  ④
Friday team meeting
I think we should set aside some time to
brainstorm ideas for ....

Nile Books                                        9:22 AM
Save on Books You'll Love
This week only, save 50% on titles by
Franz Kafka & more ....

Phil                                              9:14 AM
Training?
Do you have time today to train Suzy on
the new database interface?

---

☰  🕐  📋  ▾  ✕                         9:22 AM

Save on Books You'll Love
Nile Books

Nile Books
This week only, save 50% on titles by Franz Kafka
and more!

| Kafka<br>The Trial | Ut tincidunt, quam non<br>pellentesque ultricies, mi massa<br>tincidunt lectus, ut accumsan<br>enim ante in urna. |
|---|---|
| 50%<br>OFF! | |

| Hemingway<br>A Farewell<br>to Arms | Fusce ullamcorper neque ac tellus<br>cursus facilisis. Aliquam et orci ut<br>dolor dictum condimentum ac vel<br>elit. Aliquam erat volutpat |
|---|---|
| 50%<br>OFF! | |

MESSAGING CLIENT APPLICATION INTERFACE

CROSS-REFERENCE TO RELATED APPLICATIONS

This application is a continuation of U.S. application Ser. No. 14/248,272, filed Apr. 8, 2014 and entitled "MESSAGING CLIENT APPLICATION INTERFACE," which in turn is a continuation-in-part of U.S. application Ser. No. 14/056,838, filed Oct. 17, 2013, entitled "System and Method for Organizing Messages," which claims the benefit of U.S. Provisional Application No. 61/728,626, filed Nov. 20, 2012. The disclosure of each application is incorporated by reference herein in its entirety.

BACKGROUND

The present disclosure relates in general to computer systems and in particular to user interfaces for messaging client application programs.

Individuals are becoming increasingly reliant on electronic messaging services, such as email services, instant messaging services, SMS/MMS (also referred to as text-messaging) services, and so on. Such services allow users to send and receive messages. In some instances, the services may also provide additional features related to managing messages, such as the ability to store or archive messages in folders, delete messages, search stored messages, and so on.

Many users who rely on electronic messaging services use various electronic devices, such as laptop or desktop computers, smart phones, tablets, and so on, that are capable of connecting to various data networks and acting as clients of an electronic messaging service. For example, a client can receive messages from a messaging service and can provide a user interface that allows the user to interact with messages, e.g., by replying to messages, deleting messages, archiving messages, composing new messages to be sent, etc. When connected to a data network, the client device can communicate updates from the messaging service to the user and can communicate instructions to the messaging service to implement user actions. The convenience and speed of electronic messaging can lead to a large volume of messages being sent and received.

Unfortunately, many users of messaging services now find themselves overwhelmed by the volume of messages they receive. Techniques that allow users to better manage their messages are therefore desirable.

SUMMARY

A user of a messaging service may access the service using different client devices at different times. Each client device can execute an application program that provides a graphical user interface via which the user can read, sort, respond to, and compose messages. The client devices can vary in user-interface factors such as screen size and resolution, types of supported input devices (e.g., touchscreen versus keyboard-and-mouse), and so on. When a user moves from one client device to another, interfaces adapted for different types of input and output devices and/or different screen sizes may be inconsistent, and the user may find it difficult or non-intuitive to interact with a different client.

Certain embodiments of the present invention relate to user interfaces for messaging client applications that can provide a more consistent experience across different client devices. For example, in some embodiments, a user interface can be presented that includes a list of message collections in a first pane, a message list for a current collection in a second pane, and a currently selected message in a third pane, arranged such that all three panes are simultaneously visible on a display screen. This can scale to smaller devices by presenting fewer panes at once and allowing the user to navigate between panes. The user can interact with messages directly from the message list in the second pane. For instance, by executing various input operations on a representation of a message in the message list, the user can move a message from one collection to another, defer a message for later action, delete a message, and so on.

In embodiments where user input is received via keyboard and pointing device (e.g., a mouse), the number of clicks required to perform an operation can be reduced. For example, in some embodiments, a user operating a pointing device such as a mouse can indicate an action to be taken on a message by performing a "drag" operation on a representation of the message in the message list. The message to be acted upon can be indicated by the position (or location) of an on-screen cursor, which can be placed on the representation of the message to be acted upon. The action to be taken on the message can be indicated by the direction and distance of the drag. Similarly, a user operating a multi-touch track pad to control an on-screen cursor can perform multi-touch gestures (e.g., two-finger swipe) to indicate an action to be taken on a message, with the message being indicated by the position of the on-screen cursor and the action being indicated by the direction and distance of the swipe. Such gestures can be intuitively similar to gestures used on a different client device that has a touch screen, where the user can perform the gesture directly on the screen.

In some embodiments, the user interface can provide visual feedback during a drag operation, e.g., using color and/or glyphs, to indicate the action that will be taken if the user ends the drag at the current location.

As another example, in some embodiments, hovering an on-screen cursor over a representation of a message in the message list can result in a group of control elements (or control menu) appearing, each mapped to a different action that can be taken on the message. The user can then move the cursor to the control element corresponding to the desired action and "click" an input device to execute the action. As the user moves the cursor over a particular control element, the color of the control element and/or the control menu and/or the message can be changed to indicate the action that will be taken if the user clicks while the cursor is in its current location.

The following detailed description together with the accompanying drawings will provide a better understanding of the nature and advantages of the present invention.

BRIEF DESCRIPTION OF THE DRAWINGS

FIGS. 3A-3D show an example of a user interaction with a user interface screen according to an embodiment of the present invention.

FIGS. 8A-8E show other examples of user interactions with a user interface screen according to another embodiment of the present invention.

FIGS. 10A-10C show other examples of user interactions with a user interface screen according to another embodiment of the present invention.

FIG. 11 shows a user interface screen according to another embodiment of the present invention.

FIGS. 15A-15D show examples of other user interface screens according to various embodiments of the present invention.

FIG. 16 shows a user interface screen according to another embodiment of the present invention.

DETAILED DESCRIPTION

Figure 1:
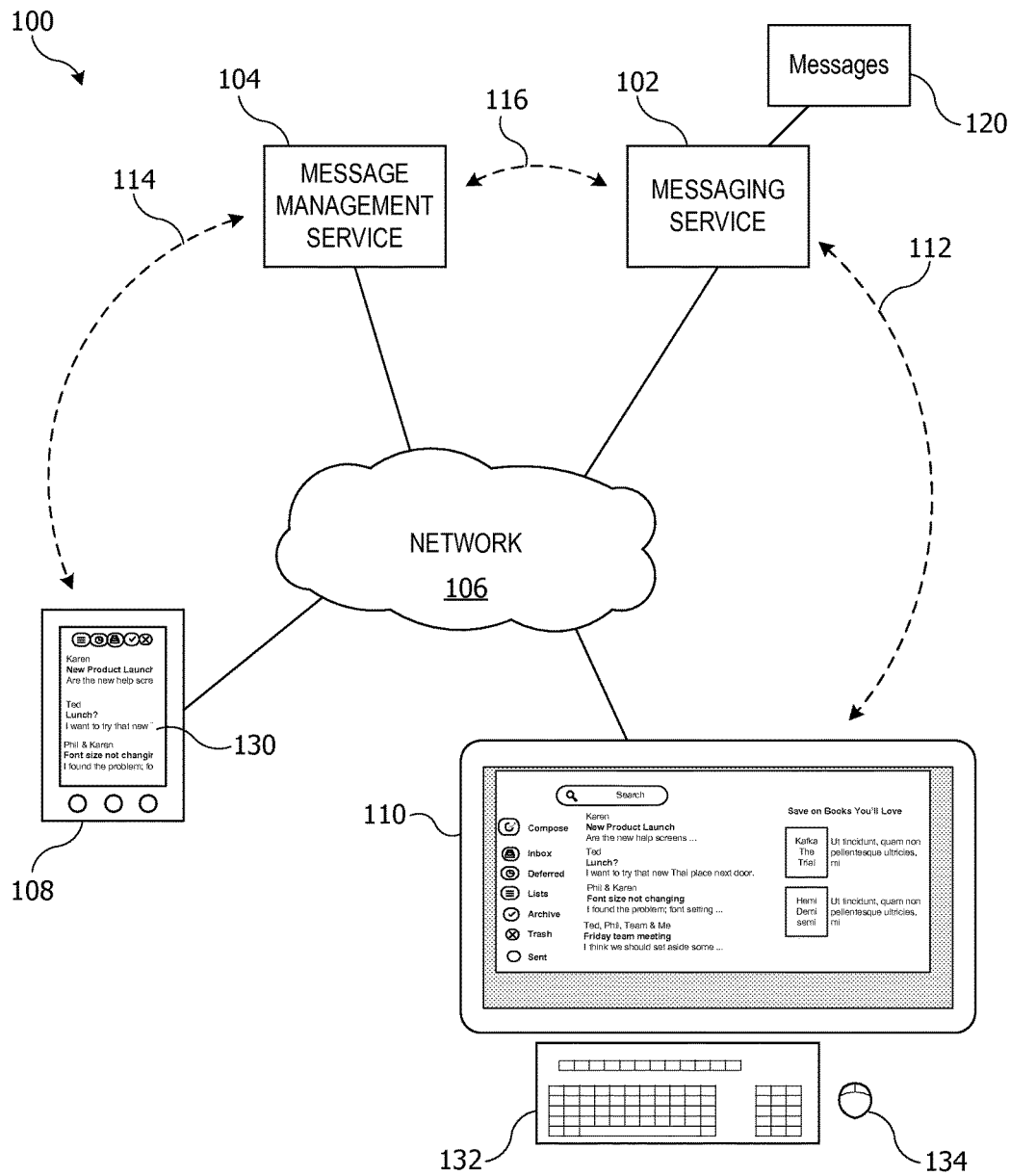
FIG. 1 shows a block diagram of a communication system according to an embodiment of the present invention.

Certain embodiments of the present invention relate to user interfaces for messaging client applications that can provide a more consistent experience across different client devices. For example, in some embodiments, a user interface can be presented that includes a list of message collections in a first pane, a message list for a current collection in a second pane, and a currently selected message in a third pane, arranged such that all three panes are simultaneously visible on a display screen. This can scale to smaller devices by presenting fewer panes at once and allowing the user to navigate between them. The user can interact with messages directly from the message list in the second pane. For instance, by executing various input operations, the user can move a message from one collection to another, defer a message for later action, delete a message, and so on.

In embodiments where user input is received via keyboard and pointing device (e.g., a mouse), the number of clicks required to perform an operation can be reduced. For example, in some embodiments, a user operating a pointing device such as a mouse can indicate an action to be taken on a message by performing a "drag" operation on a representation of the message in the message list. The message to be acted upon can be indicated by the position of an on-screen cursor, and the action to be taken can be indicated by the direction and distance of the drag. Similarly, a user operating a multi-touch track pad to control an on-screen cursor can perform multi-touch gestures (e.g., two-finger swipe) to indicate an action to be taken on a message, with the message being indicated by the position of the on-screen cursor and the action being indicated by the direction and distance of the swipe. Such gestures can be intuitively similar to gestures used on a different client device that has a touch screen, where the user can perform the gesture directly on the screen.

In some embodiments, a client device can present a user interface including a message list pane that displays a list of messages. Other panes, such as a reading pane or a pane listing message collections, might or might not be present, depending, e.g., on the available display area of the client device. The client device can receive a user input from a user input device that controls a location of an on-screen cursor, and the input can indicate a drag operation on the first message from a starting cursor location to a current cursor location. While the user input continues to indicate the drag operation, the client device can provide a visual indicator identifying an action that will be performed on the first message if the user ends the drag operation, with the indicator being selected based on the current cursor location relative to the starting cursor location. The indicator can include, for example, a glyph and/or a color corresponding to a destination collection to which the message will be moved if the user ends the drag operation at the current cursor location.

When the user input indicates an end to the drag operation, the client device can perform the identified action on the message. For example, the client device can move the message from a current message collection to a destination message collection determined based on the current cursor location relative to the starting cursor location (e.g., direction and/or distance the cursor has moved). In some instances, when the user ends the drag operation, the client device can present a selection menu for the user to select options associated with the identified action (e.g., specifying how long to defer a message). The location at which the selection menu appears can be based on the current cursor location. The user can select an option from the menu, and the client device can use the selected option in connection with performing the action on the message.

As another example, in some embodiments, hovering an on-screen cursor over a representation of a message in the message list can result in a group of control elements (or control menu) appearing, each mapped to a different action that can be taken on the message. The user can then move the cursor to the control element corresponding to the desired action and click to execute the action.

In some embodiments, the client device can present a user interface including a message list pane that displays a listing of messages. In response to user input, the client device can present a control menu that includes various control elements corresponding to actions that can be performed on the message (e.g., moving the message to various message collections). The control menu can occupy a portion of the area allocated to a message in the message list and can overlay a portion of (or all of) the message. Alternatively, the control menu can occupy an area adjacent to the area allocated to the message, and if desired, other messages can be moved (e.g., up or down) to create space to display the control menu. The control menu can provide a glyph within each control element, where the glyph indicates the action corresponding to that control element.

The control menu can be presented in a dormant state if the on-screen-cursor is located within a particular message in the message list but not within a presentation area occupied by the control menu and in an active state if the location of the on-screen cursor is within the presentation area occupied by the control menu. When the control menu is presented in the active state, at least a portion of the control menu can be presented in an active color that is determined based on which one of the control elements includes the location of the on-screen cursor. In some embodiments, the entire control menu can be presented in the active color, or the entire message within which the cursor is located can be presented in the active color. In some embodiments, the control menu can be presented in the dormant state by presenting different control elements in different translucent colors; in the active state, one or more of the control elements (e.g., the element that contains the cursor location) can become opaque.

While the cursor is within the presentation area of the control menu, the client device can receive a click input. In response to the click input, the client device can perform an action based on which one of the control elements includes the current cursor location.

FIG. 1 shows a block diagram of a communication system 100 according to an embodiment of the present invention. Communication system 100 can include a messaging service 102 and a message management service 104 connected to a network 106. Also connected to network 106 can be various clients 108, 110 that can be used to access messaging service 102 either directly (as indicated by dashed arrow 112) or indirectly via message management service 104 (as indicated by dashed arrows 114, 116). It is to be understood that access to message management service 104 and/or messaging service 102 can be occur via network 106.

Messaging service 102 can be any service that allows users to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging service 102 can include email services such as Gmail™ (a service of Google Inc.) and Yahoo!® Mail (a service of Yahoo! Inc.). Other examples can include instant messaging or chat services such as Gmail's chat feature or the Facebook chat function (a service of Facebook, Inc.), SMS/MMS services provided by cellular data carriers, social network services with a messaging component (e.g., social networks provided by Facebook, Inc., or LinkedIn Corp.), and so on. In some embodiments, a user can establish an account with messaging service 102, and messaging service 102 can store and provide access to the user's messages 120. Messaging service 102 can also provide web-based client interfaces, dedicated application programs, application program interfaces (APIs), and/or other tools for facilitating user access to messages 120 using clients 108, 110.

Message management service 104 can be a service that acts as a proxy or intermediary between messaging service 102 and clients 108, 110, as indicated by dashed arrow 116. Message management service 104 can provide enhanced functionality for organizing, storing, accessing, composing, and/or responding to messages 120 stored by messaging service 102. One example of message management service 104 can be the Mailbox service of Dropbox, Inc.

Clients 108 and 110 can be user-operated computing devices that can execute software to interact with message management service 104 and/or messaging service 102. Various types of computing devices can be used, including desktop computers, laptop computers, tablet computers, smart phones, wearable computing devices, personal digital assistants, and so on. By way of example, client 108 can be a smart phone that can execute an application program (also referred to as an app) to communicate with message management service 104 via network 106. The app can be provided by a provider of message management service 104 and can be customized to allow access to enhanced message management functions supported by message management service 104.

Client 110 can be a desktop computer that can execute an app to communicate with message management service 104. This app can be, for example, a mail client app built into an operating system of a desktop computer, a web browser that interfaces with a web server provided by message management service 104, a service-specific application provided by the provider of message management service 104, or another app. It is to be understood that in some embodiments, clients 108 and 110 can execute other apps to communicate with messaging service 102 without using message management service 104.

A given user can have accounts with both messaging service 102 and message management service 104. The user's account with message management service 104 can be linked to the user's account with messaging service 102, allowing the user to use message management service 104 to manage messages 120 sent and received via messaging service 102. In some embodiments, a user can have multiple accounts with one or more messaging services 102 and can link any or all of these accounts to a single account with message management service 104. Message management service 104 can retrieve a subset of messages for the user from messaging service 102 and deliver these messages to client 108 and/or client 110.

As shown in FIG. 1, a user can view and interact with messages using either client 108 or client 110. At various times, the same user can use both client 108 and client 110. For example, client 108 can be a mobile device that the user can easily carry (e.g., in a pocket or bag) while going about daily activities, providing convenient, on-the-go access to messages. However, client 108, being designed for portability, may have a limited screen size, limiting the amount of information that can be visible at once. Client 110 can be a desktop or laptop computer system that has a larger screen size capable of presenting more information at once, but the larger screen size may make client 110 less portable and/or less convenient for an on-the-go user to remove from a stowed location and use to access messages. Given such tradeoffs, it is expected that users may want to use different clients at different times to interact with the same messaging service 102 and/or message management service 104.

Switching back and forth between different clients can disrupt the user experience in subtle but potentially unpleasant ways. For instance, as noted above, client 108 may have a smaller display screen than client 110, making less information available at once when using client 108. As another example, client 108 may provide a touch screen interface 130 that allows the user to interact with messages by touching or performing gestures directly on an area of the screen on which the message is displayed. Client 110, in contrast, might not have a touch screen and can instead rely on separate devices such as keyboard 132 and mouse 134.

In accordance with certain embodiments of the present invention, a pleasant user experience can be facilitated by providing analogous interface controls across client devices. For example, client 108 may allow a user to move a message from the inbox to another folder or message collection by performing a swipe gesture in a particular direction across a representation of the message in a message list. In some embodiments, client 110 can support a similar interaction, for example, by allowing the user to operate mouse 134 to drag a message in a message list in a particular direction. In some embodiments, client 110 can also provide simplified and faster interactions with messages in a message list. For example, the user can select a message to act upon by hovering an on-screen cursor over the message to cause a menu of actions to appear, then select an action from the menu via point-and click. Specific examples are described below.

It will be appreciated that system 100 is illustrative and that variations and modifications are possible. Embodiments of the present invention can support any number of client devices, including client devices belonging to or otherwise associated with different users.

Further, in some embodiments, a message management service can interact with multiple messaging services and can manage messages of disparate types (e.g., email and social network messages). As described below, where the message management service interacts with multiple messaging services, the message management service can dynamically generate and suggest filtering rules with or without regard to which messaging service was the origin of a particular message.

Figure 2:
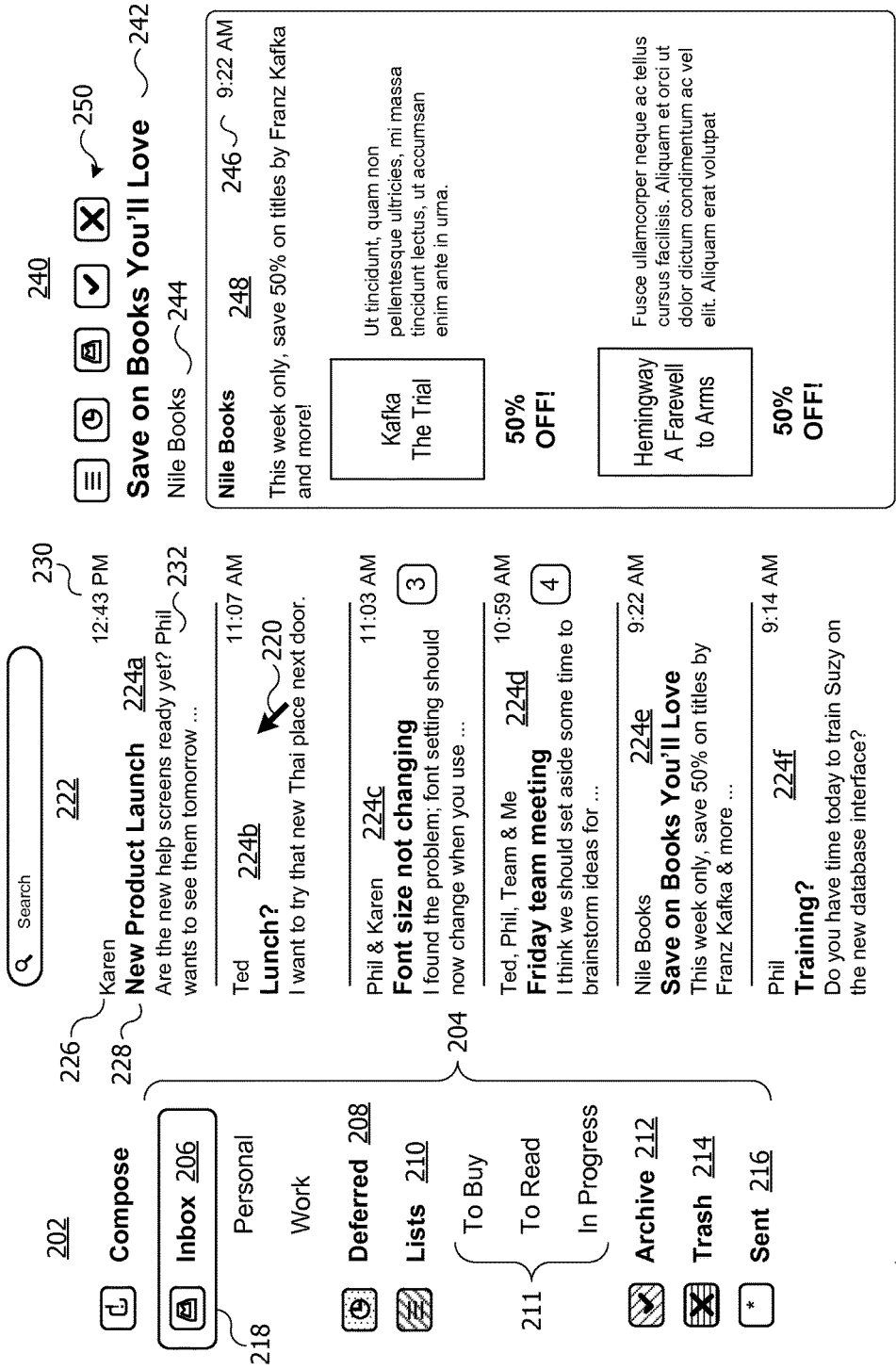
FIG. 2 shows a user interface screen according to an embodiment of the present invention.

FIG. 2 shows a user interface screen 200 according to an embodiment of the present invention. Screen 200 can be displayed on a client device with a relatively large screen, such as a desktop or laptop computer (e.g., client 110 of FIG. 1). A user can interact with screen 200 by controlling an on-screen cursor 220.

In examples described herein, it is assumed that the user interface screen is presented on a client device that does not have a touch screen or similar input capability that would allow the user to indicate input by tapping directly on a displayed item. Instead, the user can operate an input device to direct cursor 220 to a desired location on screen 200, referred to herein as "moving" or "pointing" cursor 220. It is further assumed that the user can perform a selection action, also referred to herein as "clicking," to indicate that the client device should take an action, which can be based on the current location of cursor 220. For instance, referring to FIG. 1, a user of client 110 can move mouse 134, and client 110 can interpret the motion as an instruction to change the location at which cursor 220 is rendered on screen 200. When cursor 220 is in a desired location, the user can press a control button on mouse 134, and this can be interpreted by client 110 as the selection action or "click."

Other implementations are also possible. For example, a client device can have a track pad that allows the user to indicate cursor movement by moving a finger across the track pad and to indicate selection by tapping or pressing the pad or an associated button; a pen tablet that allows the user to indicate cursor movement by moving a pen across the tablet surface and to indicate selection by pressing or tapping the pen at the desired location or on a designated area on the tablet; or a joystick that allows the user to indicate cursor movement by pushing the stick in a particular direction and to indicate selection by pressing a button. As another example, a user can indicate cursor movement in various direction by operating arrow keys (or other designated keys) on a keyboard or keypad and indicate selection by operating an enter key (or other designated key). Those skilled in the art will appreciate that still other user input devices and/or mechanisms can be used.

As shown in FIG. 2, screen 200 can include several panes of information. Left pane 202 can provide a listing of message collections 204. Message collections 204 can include an "inbox" 206 for messages that have been received for the user and are awaiting user action. Other message collections 204 can include messages that have been assigned to that collection 204 by the user, e.g., using user interface operations as described below. For example, a "deferred" message collection 208 can include messages for which the user has indicated action should be deferred until a later time. "Lists" collection 210 can include various lists 211 that the user or a messaging service or a message management service (e.g., service 102 or 104 of FIG. 1) has defined to organize messages for which further attention is needed. "Archive" collection 212 can include messages on which action has been completed. "Trash" collection 214 can include messages that are ready to be deleted. "Sent" collection 216 can include messages that the user has sent to others. Collections 204 shown in FIG. 2 are intended as examples, and other collections can also be provided in addition to or instead of those shown. In some embodiments, a user can select one of collections 204 as a "current" collection to view by operating a pointing device to move a cursor 220 over the name of the collection in left pane 202 and "clicking" to select the collection. A visual highlight 218 or other indicator can be used to identify the current collection.

Center pane 222 can display a list of messages 224a-f for the current collection. In this example, messages 224a-f are displayed in a column. For each message, e.g., message 224a, center pane 222 can show selected message information, such as a sender (or senders) 226, a subject line 228, a date/time 230 indicating when the message was sent or received, and a preview portion 232 of the message content. The number of messages presented in center pane 222 can be determined dynamically and can be based on considerations such as the available space on the display, the user's preference as to font size, and the number of messages 224 in current collection 204. If the number of messages in current collection 204 exceeds the available space, center pane 222 can be vertically scrollable to allow the user to view additional messages. If the available space exceeds the number of messages in current collection 204, white space can be presented, e.g., at the bottom of center pane 222. In some embodiments, a visual indicator can be shown at the bottom of the list to allow the user to recognize that there are no further messages in the collection. Users can interact with messages in center pane 222. For instance, a user can select a message to view (e.g., by moving cursor 220 over the message and clicking). As another example, the user can move a message from the current collection to a different ("destination") collection. Examples of user actions to control moving of messages from a collection presented in center pane 222 to a destination collection are described below.

Right pane 240 can be used to display a message selected from center pane 222. In this example, a subject line 242, sender 244, time stamp 246, and message body 248 are shown. If message body 248 is too large to fit within pane 240, pane 240 (or a portion thereof) can be scrollable to allow the user to view different portions of message body 248. In some embodiments, right pane 240 can provide a "conversation" view of related messages, such as a thread of email messages, in which all or part of the body of several different messages is presented. Right pane 240 can also include control elements 250 operable to move the current message (or conversation in the case of a conversation view)

to a different collection. Each of control elements 250 can correspond to a different collection (e.g., any of the collections 204 shown in left pane 202). Any one of control elements 250 can be selected by the user, e.g., by moving cursor 220 to the location of the desired control element 250 and clicking, and this can be interpreted as an instruction to move the message shown in right pane 240 to the corresponding collection. However, use of control elements 250 may not be the fastest way to move messages; as described below, the user can also move a message by interacting with the abbreviated message representation in center pane 222.

It will be appreciated that interface screen 200 is illustrative and that variations and modifications are possible. The arrangement and layout of screen elements (including panes, control elements, and information elements) can be varied, and different combinations of screen elements can be presented. The arrangement of the panes can also be varied, and the arrangement can include horizontal and/or vertical segmentation into panes as desired. Depending on the size of the display screen and/or user preferences, the number of panes presented at the same time can be more or fewer than the three shown. For example in a device with a relatively small display, the number of panes displayed at the same time can be reduced; on some devices, only one of panes 202, 222, and 240 might be visible at a given time. In cases where fewer than all of panes 202, 222, and 240 are visible, navigation controls (e.g., clickable control elements) can be provided to allow the user to navigate between panes. On devices with larger screens, more panes might be shown; for instance, message lists for two or more message collections can be presented at the same time, using two or more panes similar to center pane 222. The particular message collections and messages shown are also for purposes of illustration and can be modified. Further, the messages can include any type of electronically communicated messages, including but not limited to email messages, text messages, social-network messages, photo or image messages, and so on.

In some embodiments, a user can interact with center pane 220 to move a message 224 from one collection to another. Examples of such interactions will now be described.

One type of interaction can be based on a "drag" operation using a pointing device. In one example of a drag operation, a user can hold down a button while moving cursor 220 from a starting location to an ending location, then release the button once cursor 220 has reached the desired ending location. For instance, referring to FIG. 1, a user can execute a drag operation by holding down a control button on mouse 134 while moving mouse 134. A user with a track pad can hold down a control button or press into the track pad while moving a finger to indicate a drag, then release the button once cursor 220 has reached the desired ending location. If the track pad is able to detect multiple simultaneous contact points (also referred to as "multi-touch"), a drag operation can be defined based on movement of multiple contact points. For instance, a drag operation can be defined as holding one finger (or other contacting object) still on the touch pad while moving another finger, with the moving finger indicating the direction of the drag. As another example, a drag operation can be defined as a movement of two fingers (or other contacting objects) on the track pad in the same direction with approximately constant spacing between them. In either case, the end of the drag can be detected when one or both fingers cease to be in contact with the track pad. As yet another example, a user can indicate a drag operation using a keyboard, e.g., by operating arrow keys (or other designated keys) while holding down a control key (or other designated key), and the drag operation can end when the user releases the control key. Other drag operations can be defined based on the type(s) of user input devices available on a particular client device.

In some embodiments of the present invention, a user can perform drag operations to instruct the client device to move a message from one collection to another, with the length and direction of the drag indicating the destination collection. An example is shown in FIGS. 3A-3D.

FIG. 3A shows a user interface screen 300 according to an embodiment of the present invention. Screen 300 can be generally similar to screen 200 of FIG. 2, and center pane 322 and cursor 320 can be similar to center pane 222 and cursor 220 described above. A user can position cursor 320 over a message at an initial position as shown, then drag cursor 320 to the right.

Figure 3B:
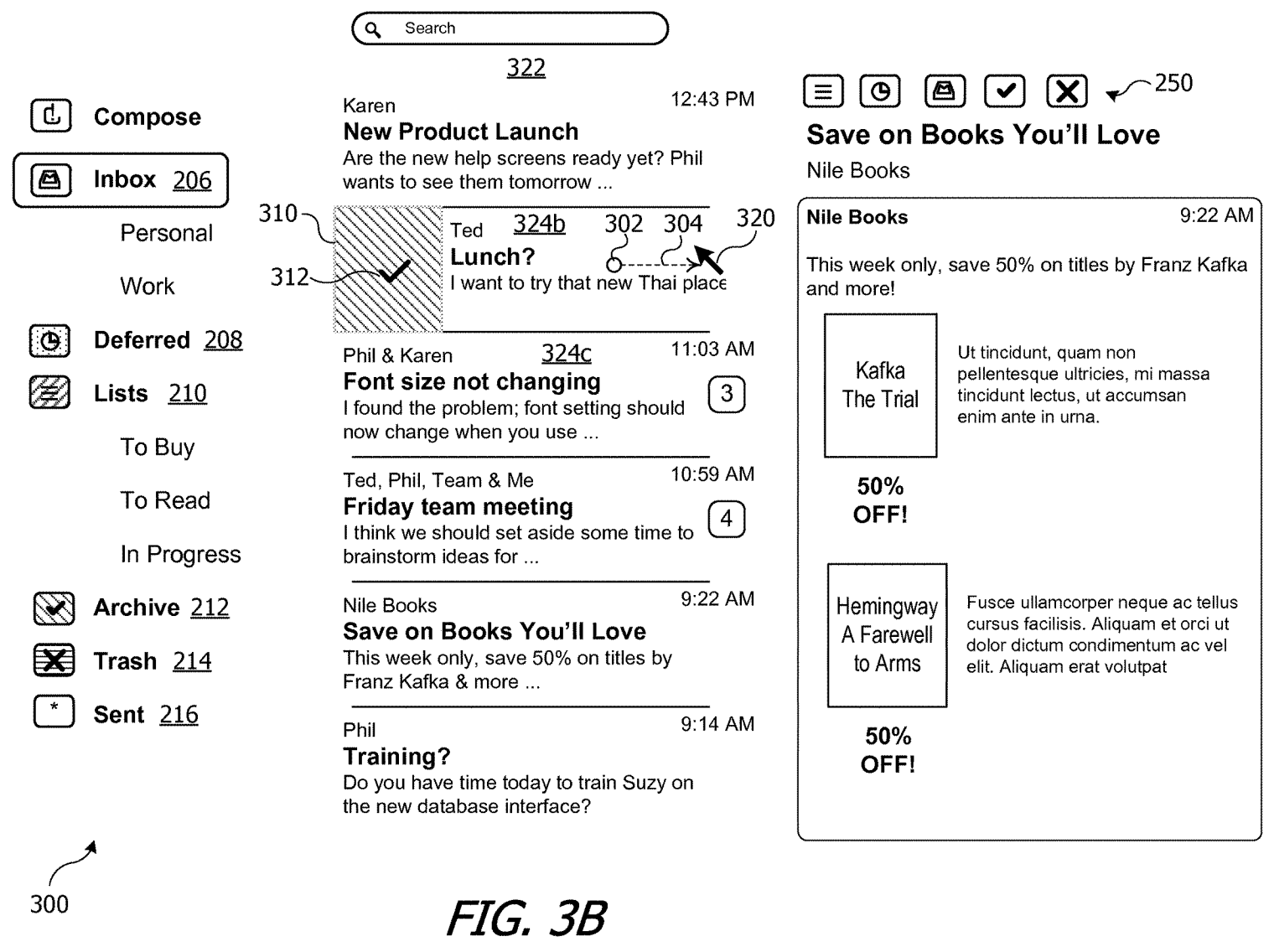

FIG. 3B shows user interface 300 after the user has dragged cursor 320 to the right, as indicated by dotted arrow 304. Message 324*b* can move to the right as cursor 320 moves, e.g., so that the same portion of message 324*b* remains under cursor 320, and an action indicator 310 can appear in the space vacated by message 324*b*. Action indicator 310 can indicate moving message 324*b* from its current collection (e.g., inbox 206) to a destination collection. In this example, the destination collection can be archive collection 212. The specific destination collection can be visually indicated to the user. For example, action indicator 310 can include a glyph 312 associated with the destination collection (in this case, archive collection 212). Additionally or instead, different colors (shown in the drawings as different fill patterns) can be associated with each collection, and action indicator 310 can include coloring the region in which it appears to match the color associated with the destination collection, as shown in FIG. 3B.

Figure 3C:
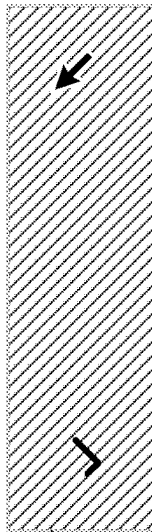
Figure 3D:
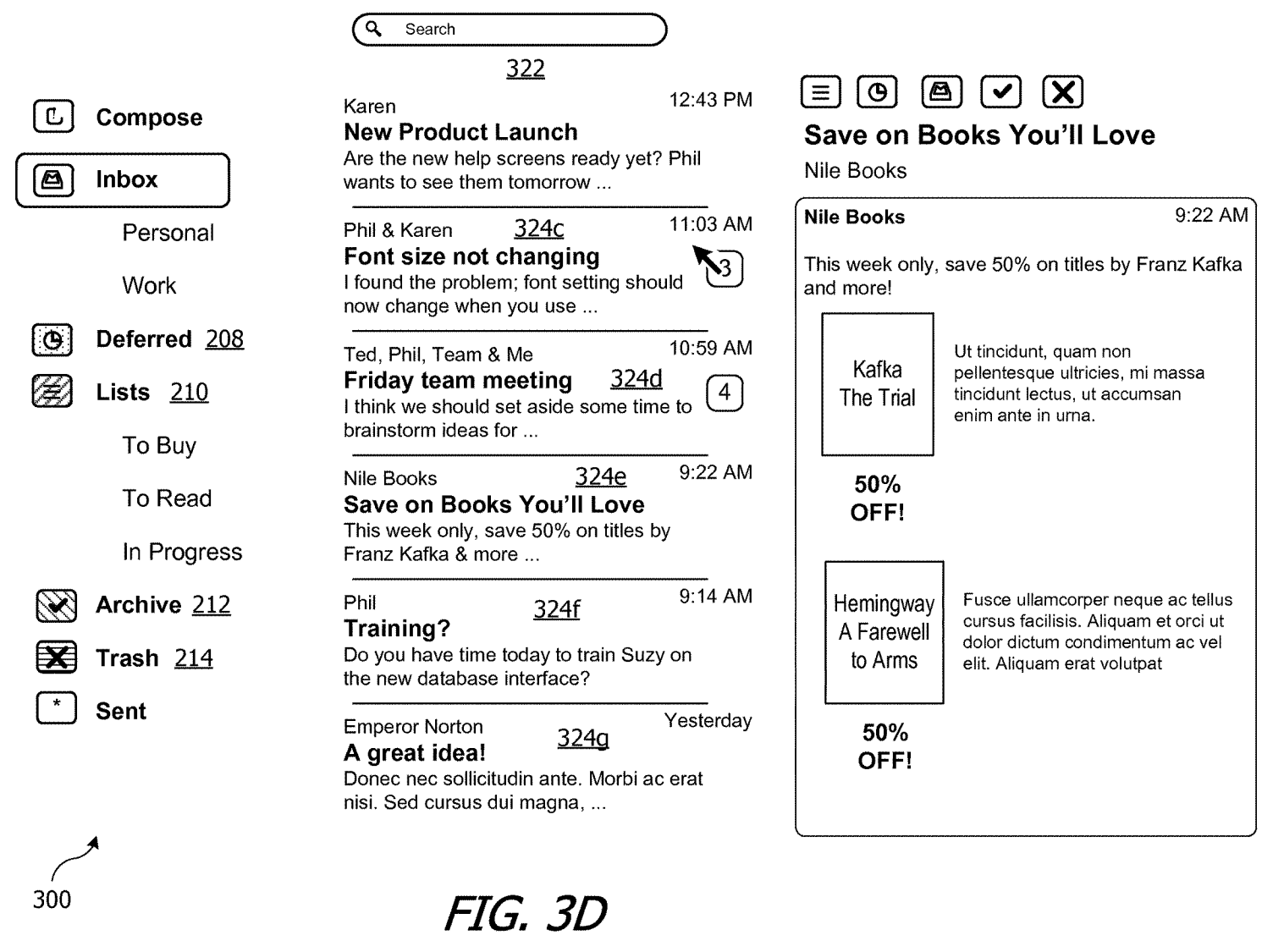

If the user ends the drag at the position shown in FIG. 3B, this can be interpreted as indicating that message 324*b* should be moved to archive collection 212, and the client can perform this action. In some embodiments, an animated transition suggesting the action can be presented to provide a confirmation to the user. For instance, as shown in FIG. 3C, action indicator 310 can expand to fill the area allotted to message 324*b*; in some embodiments, the transition can be an animated transition, with message 324*b* continuing to slide out of pane 322 to the right as action indicator 310 expands. Thereafter, as shown in FIG. 3D, messages 324*c-f* in center pane 322 can move up to close the space created by the removal of message 324*b*. Again, this transition can be animated so that the user sees the messages moving up. In this example, message 324*g*, which was previously not seen, becomes visible, filling the space vacated by message 324*f.*

Figure 4:
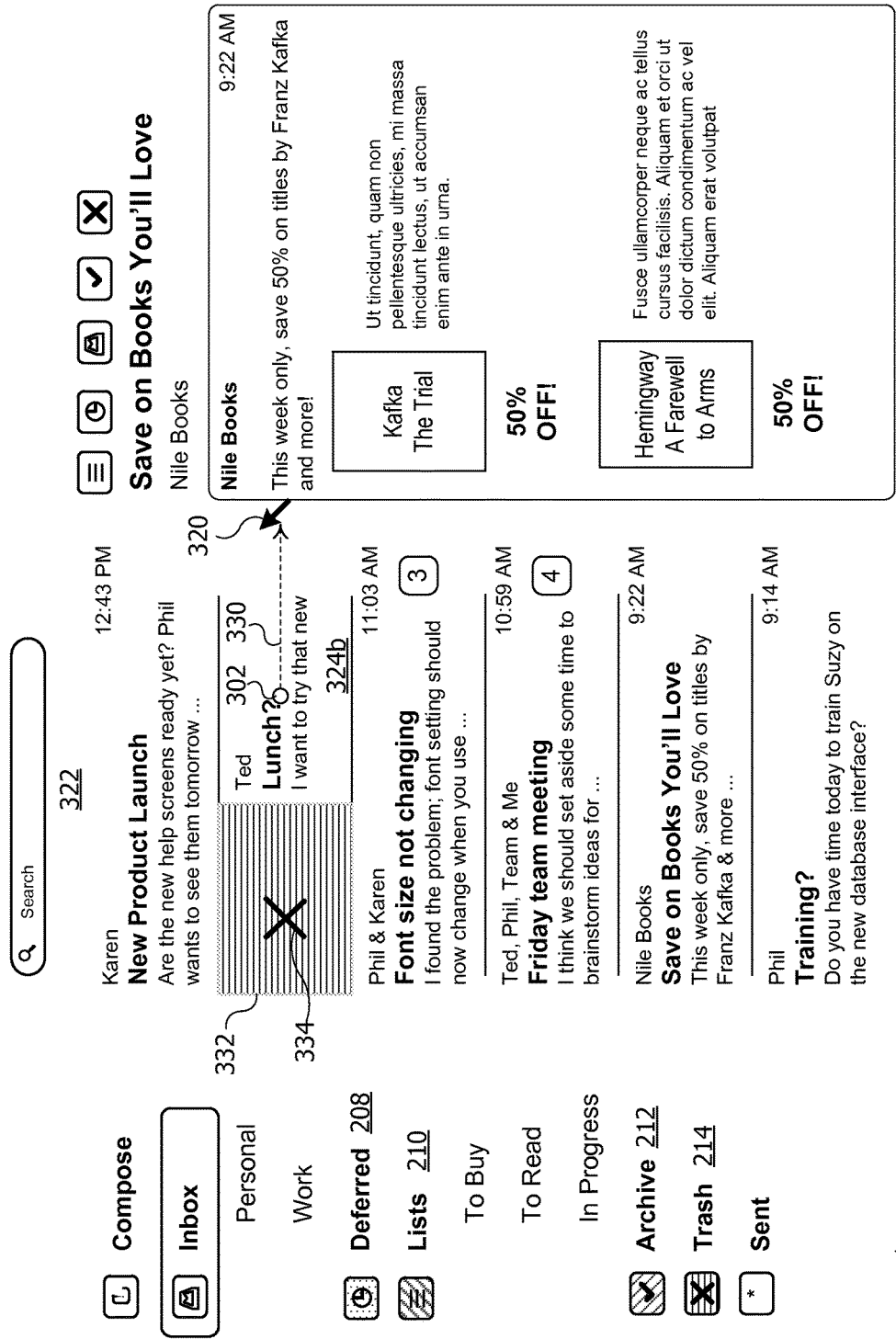
FIG. 4 shows another example of a user interaction with a user interface screen according to an embodiment of the present invention.

In some embodiments, different destination collections can be selected by dragging the message by a different distance. For instance, from the position shown in FIG. 3B, the user can continue to drag cursor 320 to the right instead of ending the drag. FIG. 4 shows screen 300 when the user continues to drag cursor 320 to the right (as shown by dotted arrow 330) according to an embodiment of the present invention. Message 324*b* can continue to move with cursor 320. Action indicator 310 of FIG. 3B can continue to expand to fill the vacated space and can transition to a different action indicator 332, to indicate moving message 324*b* from inbox 206 to a different destination collection. In this example, instead of archive collection 212 as in FIG. 3B, the destination collection becomes trash collection 214. The change in destination collection can be visually indicated to the user. For example, action indicator 332 can include a glyph 334 associated with trash collection 214. Additionally or instead, where different colors (shown as different fill patterns) are associated with each collection, action indicator 332 can change color to match the color associated with trash collection 214. For example, if archive collection 212 is associated with the color green and trash collection 214 with the color red, the user can see green action indicator 310 become red action indicator 332 when the drag is extended long enough to reach the transition. If the user ends the drag at the position shown in FIG. 4, message 324b can be moved to trash collection 214. The transition can be animated similarly to the transition shown in FIGS. 3C and 3D.

Figure 5A:
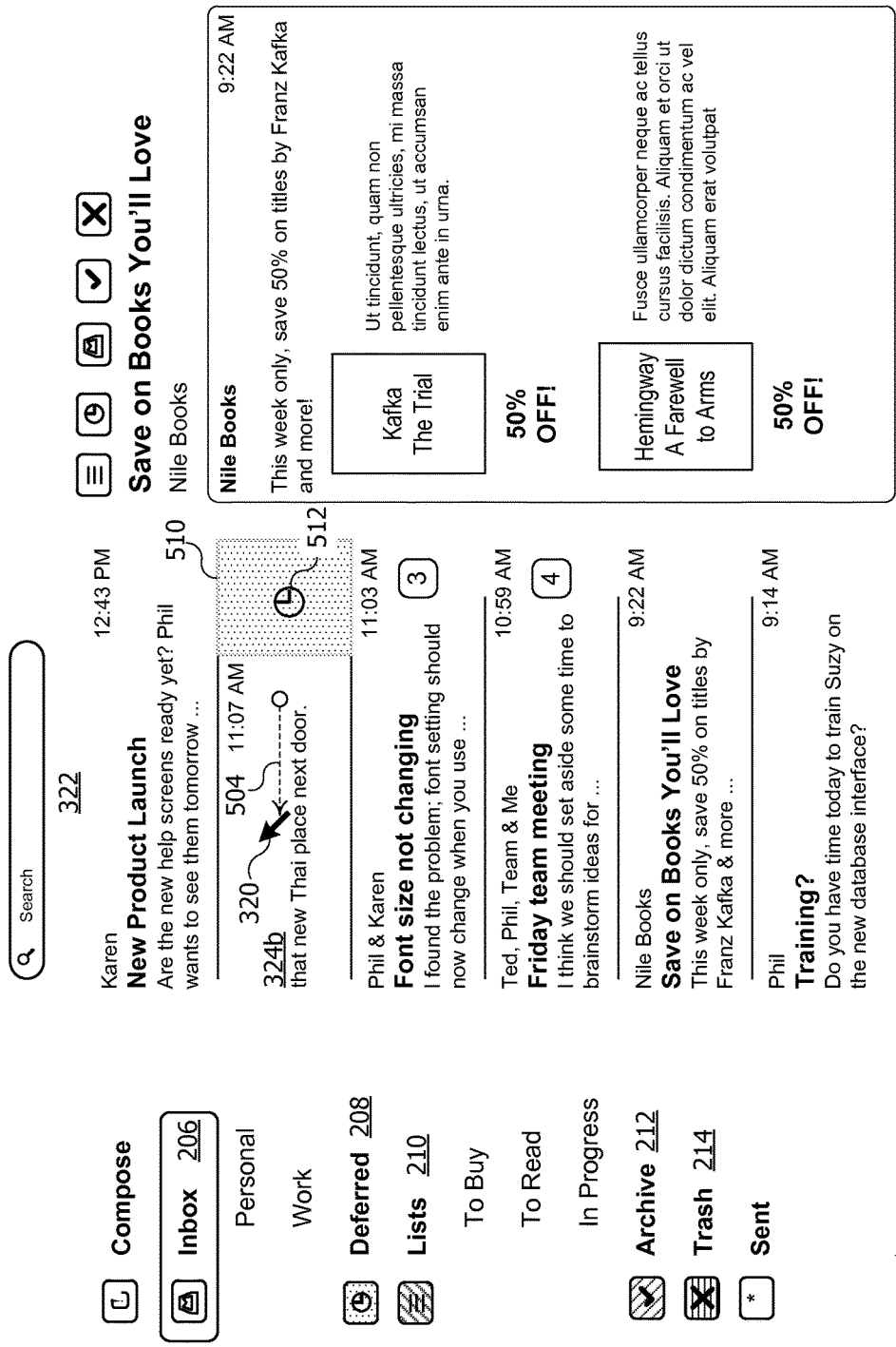
FIGS. 5A-5B show another example of a user interaction with a user interface screen according to an embodiment of the present invention.

In some embodiments, different destination collections can be indicated by dragging the message in a different direction. For instance, from the position shown in FIG. 3A, the user can drag cursor 320 to the left instead of to the right. FIG. 5A shows screen 300 when the user, from the position shown in FIG. 3A, drags cursor 320 to the left according to an embodiment of the present invention. Message 324b can move to the left as cursor 320 moves, e.g., so that the same portion of message 324b remains under cursor 320, and an action indicator 510 can appear in the space vacated by message 324b. Action indicator 510 in this example indicates moving message 324b from its current collection (inbox 206) to deferred message collection 208. As in the examples above, the destination collection can be visually indicated by the color of the region of action indicator 510 and/or the inclusion of a corresponding glyph 512.

Figure 5B:
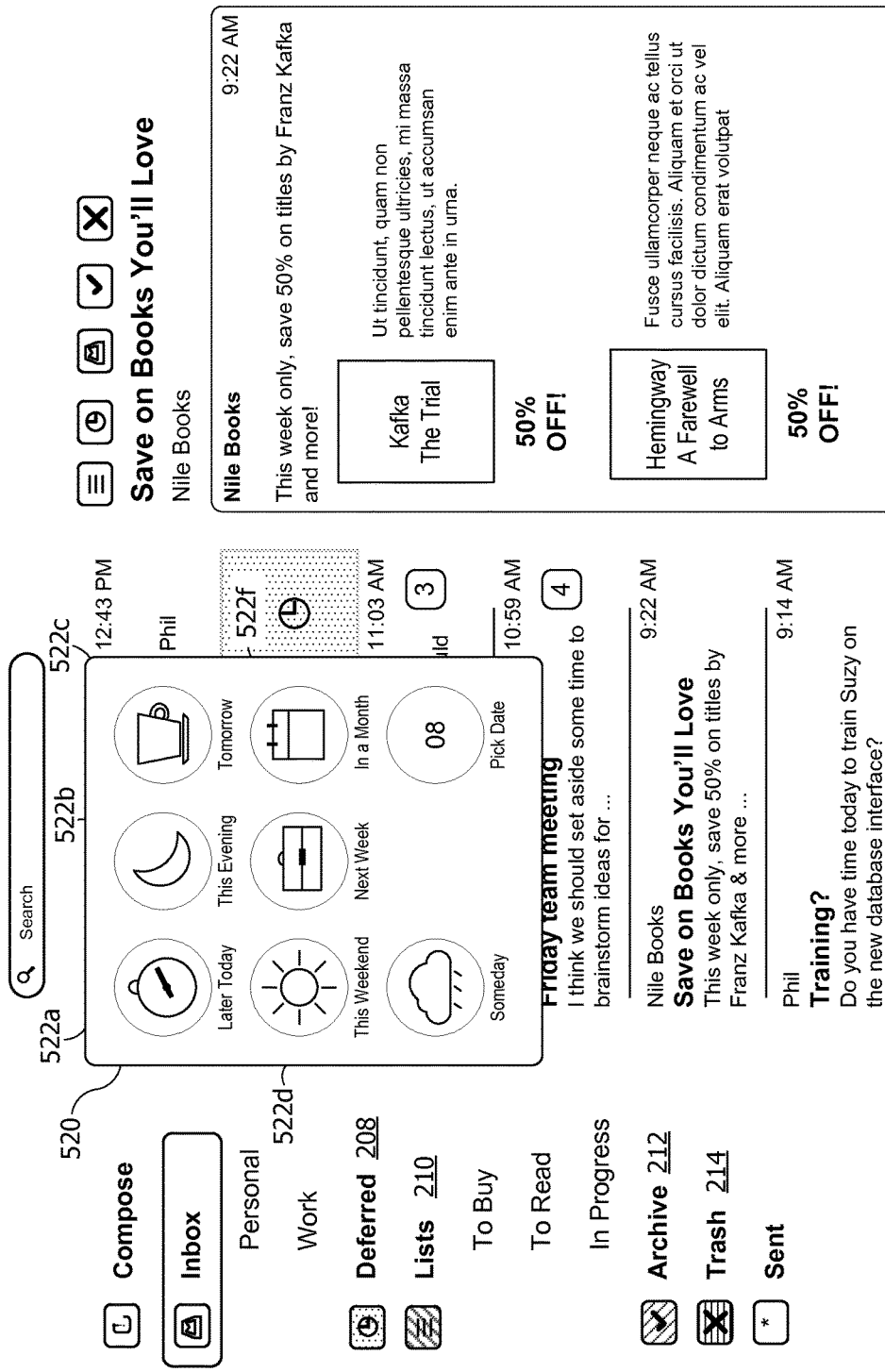

If the user ends the drag at the position shown in FIG. 5A, this can be interpreted as indicating that message 324b should be deferred for later action (e.g., by moving it to deferred collection 208). In some embodiments, the user may be able to specify how long a message should be deferred. Accordingly, if the user ends the drag at the position shown in 5A, a selection menu can appear. FIG. 5B shows screen 300 with a selection menu 520 that can appear when the user ends a drag operation at the position shown in FIG. 5A according to an embodiment of the present invention. Selection menu 520 can present a set of options 522a-h for deferring message 324b, and the user can select one of options 522a-h, e.g., by moving cursor 320 over the desired option and clicking. Once the user makes a selection, menu 520 can disappear, and message 324b can be removed from center pane 320, e.g., using an animated transition similar to that of FIGS. 3B-3D.

In some embodiments, selection menu 520 can appear at a position determined by the location of cursor 320 at the end of the drag operation. For example, selection menu 520 can be rendered at a position such that cursor 320 is located at or near the center of selection menu 520, or at the top left corner, top right corner, or any other location. In some instances, the position of selection menu 520 can be constrained, e.g., by a rule that selection menu 520 should not extend beyond the edge of the visible area. Consistent positioning of selection menu 520 relative to cursor 320 can make selection menu 520 more conspicuous for the user. Further, if selection menu 520 is positioned such that cursor 320 is already near or inside menu 520, this can allow for faster user response, as cursor 320 does not have to be moved far in order to make a selection.

Figure 6A:
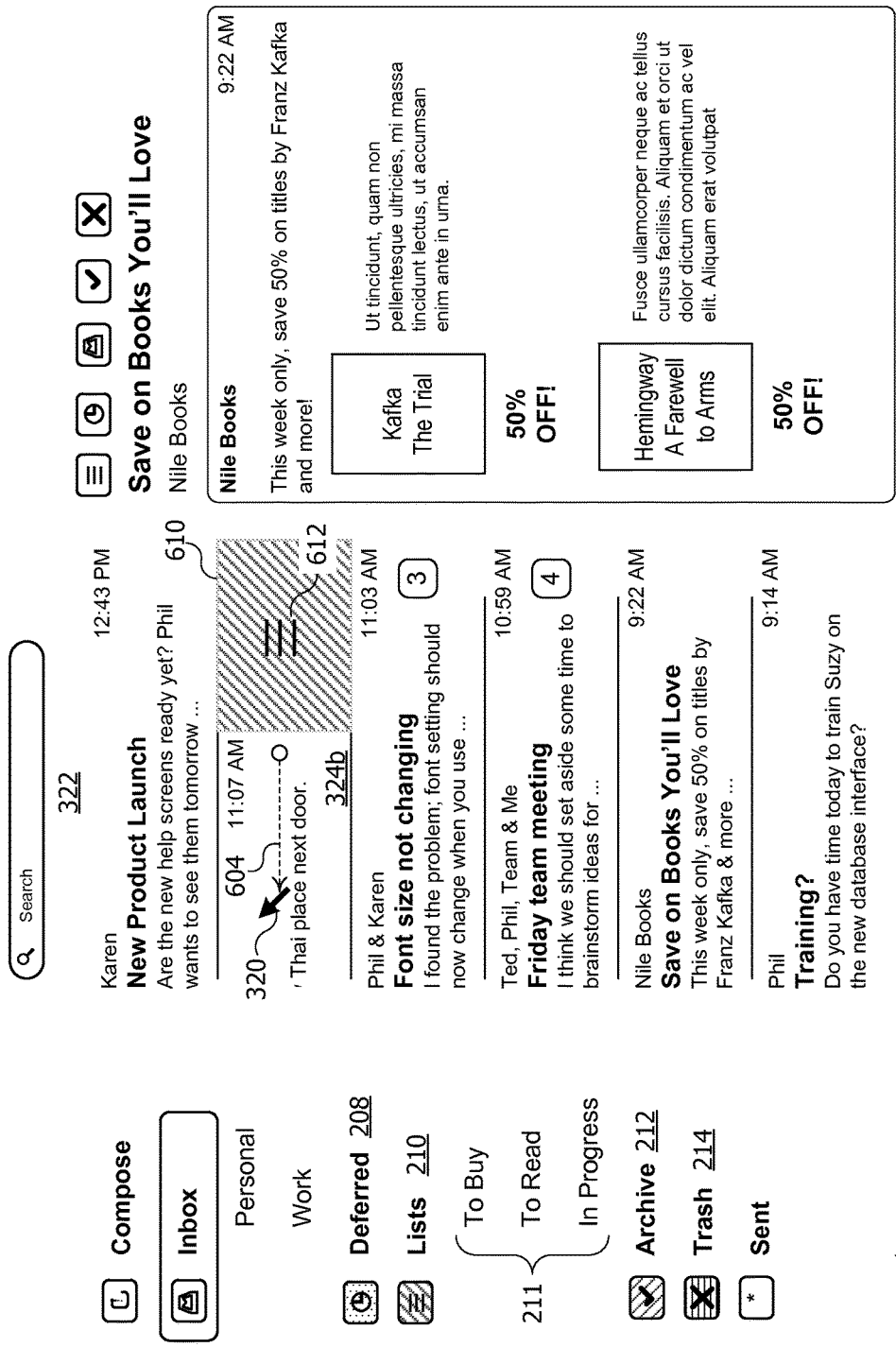
FIGS. 6A-6B show another example of a user interaction with a user interface screen according to an embodiment of the present invention.

In some embodiments, instead of ending the drag at the position shown in FIG. 5A, the user can continue the drag to the left to select a different destination collection. FIG. 6A shows screen 300 when the user continues to drag cursor 320 to the left (as shown by dotted arrow 630) according to an embodiment of the present invention. Message 324b can continue to move with cursor 320. Action indicator 510 of FIG. 5A can continue to expand to fill the vacated space and can transition to a different action indicator 610, to indicate moving message 324b from inbox 206 to a different destination collection. In this example, instead of deferred collection 208 as in FIG. 5A, the destination collection becomes lists collection 210. The change in destination collection can be visually indicated to the user. For example, action indicator 610 can include a glyph 612 associated with lists collection 210. Additionally or instead, where different colors (shown as different fill patterns) are associated with each collection, action indicator 610 can change color to match the color associated with lists collection 210. For example, if deferred collection 208 is associated with the color yellow and lists collection 210 with the color brown, the user can see yellow action indicator 510 become brown action indicator 610 when the drag is extended long enough to reach the transition.

Figure 6B:
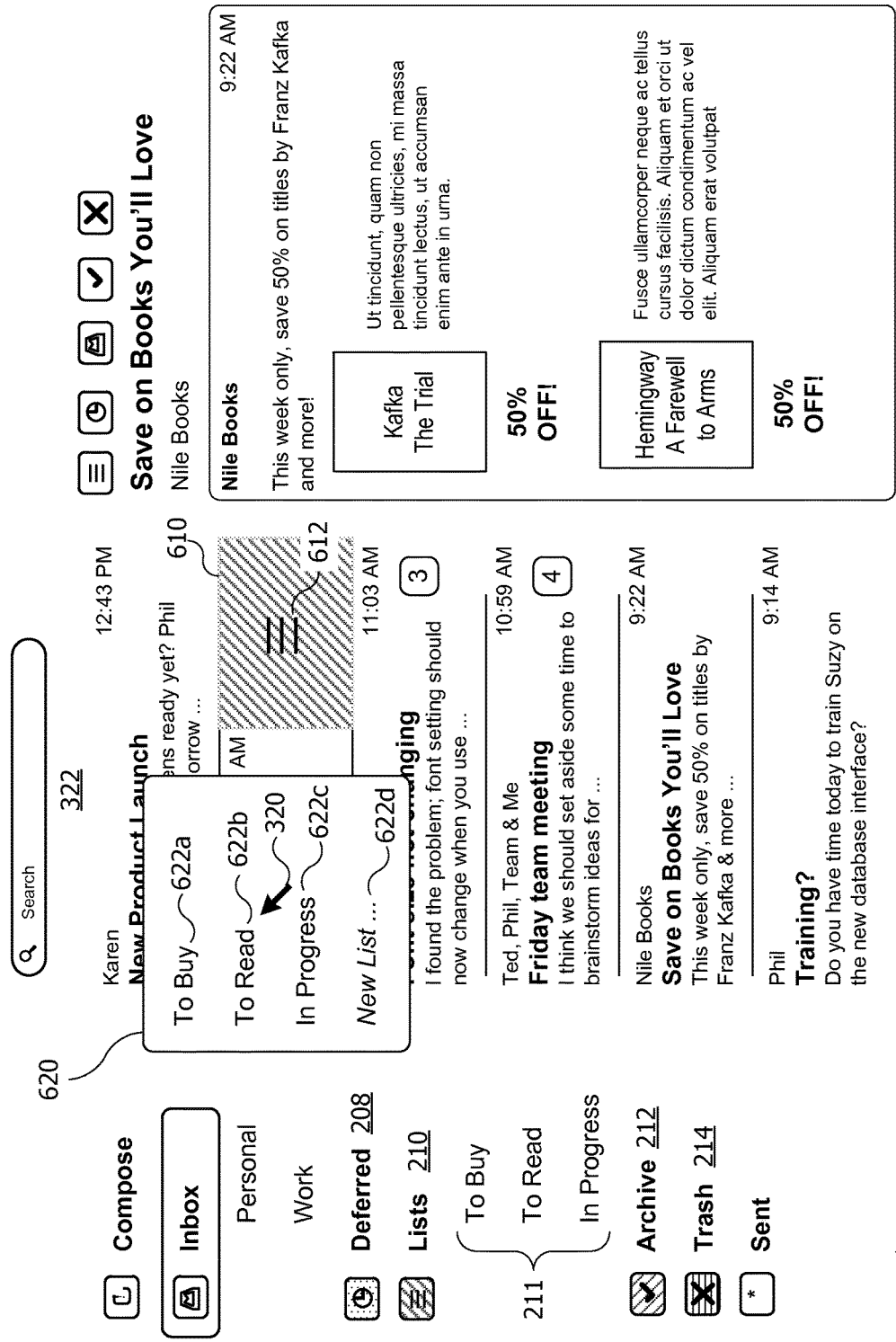

If the user ends the drag at the position shown in FIG. 6A, message 324b can be moved to a list in lists collection 210. In some embodiments, the user can have multiple lists 211 within lists collection 210, and a selection menu can appear to allow the user to select the destination list. FIG. 6B shows screen 300 with a selection menu 620 that can appear when the user ends the drag at the position shown in FIG. 6A according to an embodiment of the present invention. Similarly to selection menu 520 of FIG. 5B, selection menu 620 can be rendered at a screen position that is determined based on the location of cursor 320 at the end of the drag operation. Selection menu 620 can present a set of options 622a-c for selecting an existing list, as well as an option 622d to create a new list. The user can select one of options 622a-d, e.g., by moving cursor 320 over the desired option and clicking. If the user selects option 622d, the user can be prompted to enter a name for the new list, e.g., by replacing or overlaying selection menu 620 with a prompt to type in the name. Once the user makes a selection (and enters a new list name if appropriate), menu 620 can disappear, and message 324b can be removed from center pane 320, e.g., using an animated transition similar to that of FIGS. 3B-3D.

In combination, the interfaces and actions shown in FIGS. 3A-3D, 4, 5A-5B, and 6A-6B can allow the user to quickly sort messages from one collection (e.g., inbox 206) into other collections (e.g., any or all of deferred collection 208, lists collection 210, archive collection 212, and trash collection 214). The user can drag a message left or right by a certain distance and receive dynamic visual feedback indicating a current destination collection that the user can select by releasing the drag at that point. The feedback can be presented in a form that the user can quickly recognize and understand (e.g., distinctive colors and/or glyphs that map to the destination collections) As shown in FIG. 3D, when a message is moved to another collection, another message can move up to the cursor location, so the user can quickly move through a list of emails by just horizontal dragging. In some embodiments, the user may occasionally want to move the cursor left or right to keep it within center pane 322; the user can also move the cursor vertically if desired, so that messages do not have to be handled in the order in which they are listed in center pane 320. In some embodiments, such as where a two-finger gesture on a track pad is recognized as a drag, the cursor can stay in a fixed location during a horizontal drag, which can allow for even faster user action if there is no need to reposition cursor 320 over center pane 322.

Figure 7:
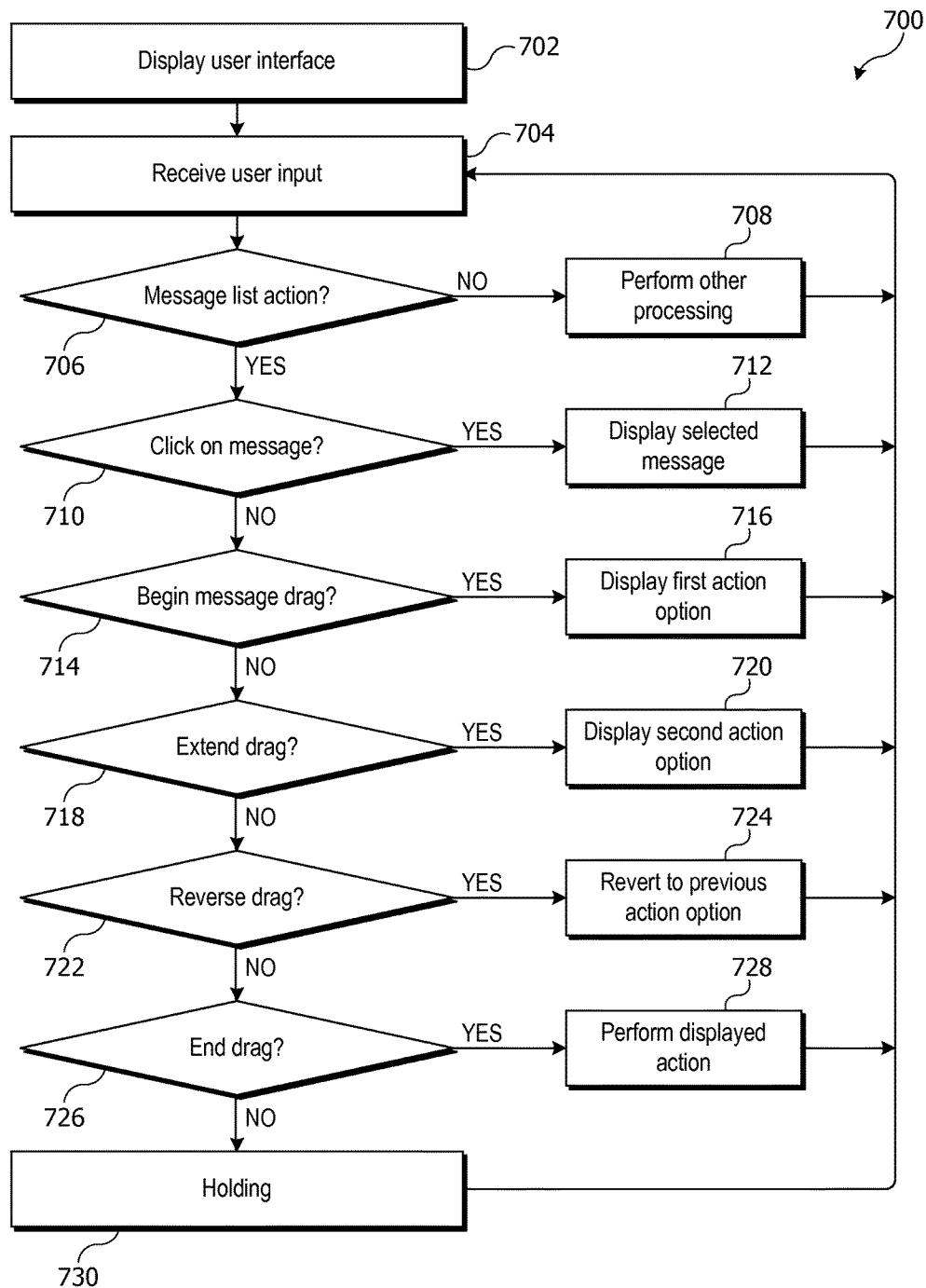
FIG. 7 shows a flow diagram of a process for message processing according to an embodiment of the present invention.

FIG. 7 is a flow diagram of a process 700 for message processing according to an embodiment of the present invention. Process 700 can be implemented in a client device, e.g., client 110 of FIG. 1 using interface screens similar to those described above.

At block 702, client 110 can display a user interface, e.g., interface screen 300 of FIG. 3A. At block 704, client 110 can receive user input. The user input at any given time can include, for example, cursor movement, clicking, and/or dragging. Client 110 can take action based on the input and return to block 704 to receive further input.

More specifically, at block 706, client 110 can determine whether the user input corresponds to an action on a message list. For instance, if the user is simply moving cursor 320, or if the user performs a click or a drag while cursor 320 is not positioned over a message in center pane 322 of FIG. 3A, such inputs would not correspond to an action on a message list. In this case, at block 708, client 110 can perform appropriate input processing. Depending on the specific user input and implementation, such processing can include changing the current message collection displayed in center pane 320, moving a message to a collection based on user operation of control elements 250, opening a window or pane for the user to compose a message, and so on. It is to be understood that any type of input processing can occur at block 708.

The remaining portions of process 700 show more specific examples of input processing that can occur when the user input corresponds to an action on a message list, e.g., an action performed while cursor 320 is positioned over a message in center pane 322 of FIG. 3A. For instance, at block 710, client 110 can determine whether the input corresponds to clicking on a message in center pane 322. If so, then at block 712, client 110 can display the message that was selected, e.g., in right pane 240. The user can then read the displayed message and move it to a different collection, either by operating one of control elements 250 or by interacting with the message list in center pane 322.

At block 714, client 110 can determine whether the user has begun a drag operation on a message (e.g., message 324*b*) in center pane 322. For example, a drag can be detected if, at a time when cursor 320 is positioned over a message, the user holds down a control button while moving a pointing device at least a certain minimum distance either to the left or right. The minimum distance can be selected as desired and can depend on properties of the pointing device; in some embodiments, the distance is selected to be long enough that it is unlikely that the action occurred by accident while the user was trying to execute some operation other than a drag. As another example, where a multi-touch track pad is used, a movement of two fingers horizontally for at least a minimum distance can be detected as beginning a message drag. At block 716, when the beginning of a message drag is detected, client 110 can display a first action option. The action option can depend on the direction of the drag. For instance, if the drag is to the right, action indicator 310 of FIG. 3B can be displayed; if the drag is to the left, action indicator 510 of FIG. 5A can be displayed.

At block 718, client 110 can determine whether the user has extended a drag operation that was previously begun. For example, extension of a drag can be detected if, at a time when blocks 714 and 716 have previously been executed to display a first action option based on detecting a begin-drag, the user continues to hold down the control button while moving a pointing device in the same direction by at least a second threshold distance (y) beyond the distance (x) that caused the begin-drag to be detected. In some embodiments, the second threshold distance y can be equal to the minimum distance x; that is, if dragging by distance x indicates a begin-drag, then dragging by 2x indicates an extended drag. Other thresholds can also be chosen, and the second threshold distance y can be long enough that it is easy for the user to drag far enough (distance x) to trigger a begin-drag without also performing an extended drag (minimum distance x+y). At block 720, when an extended drag is detected, client 110 can transition the display to display a second action option. The second action option can depend on the direction of the drag. For instance, if a drag to the right is extended, action indicator 310 of FIG. 3B can transition to action indicator 332 of FIG. 4; if a drag to the left is extended, action indicator 510 of FIG. 5A can transition to action indicator 610 of FIG. 6A. In some embodiments, an extended drag operation can be further extended at block 718 to allow a third action option in each direction, and so on.

At block 722, client 110 can determine whether the user has reversed the direction of a drag operation that is in progress. This can occur, e.g., after detecting a begin-drag at block 714 or an extended drag at block 718. A reversal of drag direction can be detected, e.g., if while the user continues to hold the control button, motion of a pointing device that was previously moving to the left (right) becomes motion to the right (left). As another example, on a multi-touch track pad, a reversal of drag direction can be detected if the fingers (or other contact objects) begin moving in the other direction without lifting off the track pad. As with other drag actions, detecting a reversal can require that the movement in the reverse direction cover a large enough distance (e.g., distance y as defined above) to make it unlikely to have occurred inadvertently. When a reversal of drag direction is detected, at block 724, client 110 can revert to a previously displayed action option. For instance, if the reversal occurs when action indicator 322 of FIG. 4 is displayed, client 110 can revert to displaying action indicator 310 of FIG. 3B; if the reversal occurs when action indicator 610 of FIG. 6A is displayed, client 110 can revert to displaying action indicator 510 of FIG. 5A. If the reversal occurs when action indicator 310 of FIG. 3B or action indicator 510 of FIG. 5A is displayed, client 110 can revert to the initial state shown in FIG. 3A, where no action option is displayed.

At block 726, client 110 can determine whether the user has ended the drag operation. For example, client 110 can detect whether the user has released the control button of a mouse or lifted fingers off a track pad. If the drag operation has ended, at block 728, client 110 can perform an action on the message, such as moving the message to a destination collection. The message to be acted upon can be the message over which cursor 320 is positioned. (Where the displayed message moves with the cursor during a drag, the message is, in effect, selected at the beginning of the drag.) The action to be performed can be the action corresponding to the action indicator that is displayed when the drag operation ends. For instance, if action indicator 310 of FIG. 3B was being displayed, the message can be moved to archive collection 212. If action indicator 322 of FIG. 4 was being displayed, the message can be moved to trash collection 214. If action indicator 510 of FIG. 5A was being displayed, the message can be moved to deferred-message collection 208, and if action indicator 610 of FIG. 6A was being displayed, the message can be moved to lists collection 210. In the latter two cases, performing the action at block 728 can include displaying a further selection menu (e.g., menu 520 of FIG. 5B or menu 620 of FIG. 6B) to allow the user to further specify how the message should be handled. In some instances, a drag operation can end with the message in the state shown in FIG. 3A, where no action indicator is displayed. In this case, block 728 can result in taking no action on the message.

Moving a message to a destination collection can be accomplished in various ways. For example, the message can be removed from the message list in center pane 320 to indicate to the user that the message is being moved. An animated transition, e.g., as described above, can be used. In addition to updating the display, a message repository can also be updated to move the message from its previous collection to the destination collection. For example, referring to FIG. 1, client 110 can update a local store of message information to indicate which message collection now includes the message that was moved. Additionally or instead, client 110 can communicate an instruction to move the message to messaging service 102 or to message management service 104 (which in turn can provide a move-message instruction to messaging service 102). Depending on the particular implementation, moving a message to a destination collection can include changing message metadata (e.g., collection-identifying tags assigned to the message), updating pointers to the message (e.g., where a message collection is implemented by providing a list or other set of pointers to the messages included in that collection), moving the message to a different folder (e.g., where a message collection is implemented as a folder in a filesystem), and/or other actions depending on how message data is stored and maintained by a particular service or client device.

Referring again to FIG. 7, at block 730, the user can be holding cursor 320 at a constant position without ending a drag operation. For example, the user may be hesitating before committing to an action on the message. Where this is the case, process 700 can wait for further input at block 704.

It will be appreciated that process 700 is illustrative and that variations and modifications are possible. Steps described as sequential may be executed in parallel, order of steps may be varied, and steps may be modified, combined, added or omitted. For instance, the set of actions that can be performed on a message can include more actions, fewer actions, or different actions, and the set is not limited to actions related to moving a message to a destination collection. Further, in the case of moving a message, the particular destination collection associated with a given direction and distance of a drag can depend on which collection is the current message collection displayed in center pane 320. The particular definition of a user action corresponding to a drag can be modified as desired, e.g., based on the user input device(s) supported by a given client device. Further, while the foregoing description refers to dragging a message in a specific direction (e.g., left or right), other embodiments may provide for dragging messages in other directions in order to effect message-processing actions.

In embodiments described above, a user can perform a drag operation to move a message from a currently displayed collection to another collection. In other embodiments, when the user "hovers" an on-screen cursor over a message representation in a message list, a set of control elements for moving the message (also referred to as a "control menu") can be presented, and the user can click on one of the control element to select it. In some embodiments, the set of control elements can initially be presented in a "dormant" state when the user hovers the cursor over the message, and one of the control elements (or the entire control menu) can transition to an "active" state if the user moves the cursor over that control element. The dormant and active states can be visually distinct; examples are described below.

Figure 8A:
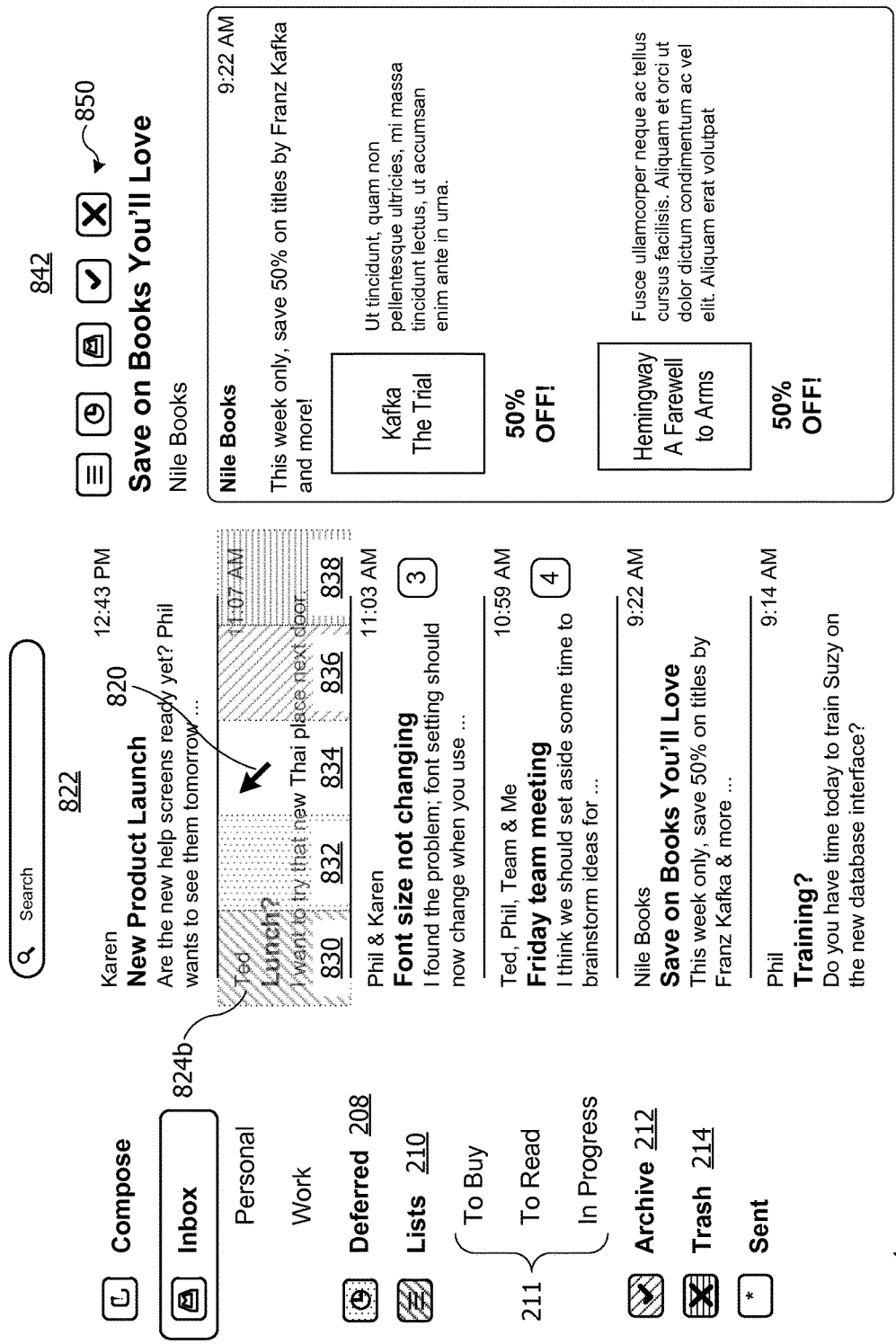

FIG. 8A shows a user interface screen 800 according to an embodiment of the present invention. Screen 800 can be generally similar to screen 200 of FIG. 2. For example, center pane 822 and cursor 820 can be similar to center pane 222 and cursor 220 described above. A user can hover cursor 820 over a message, e.g., message 824b, in center pane 822. "Hovering" a cursor, as used herein, can include, for example, allowing the cursor to remain at rest for a minimum period of time (e.g., one second or half a second). Hovering can also include moving the cursor across a portion of screen 800 occupied by message 824b while not operating any control buttons of a user input device.

When cursor 820 hovers over message 824b, a control menu that includes control elements 830, 832, 834, 836 can appear in a dormant state. In this example, each of control elements 830, 832 834, 836 can appear in the dormant state as a translucent colored region overlaying a different portion of message 824b. The colors can be selected to be associated with different message collections. For instance, control element 830 can be in a color (e.g., brown) associated with lists collection 810, control element 832 can be in a color (e.g., yellow) associated with deferred collection 808, control element 834 can be in a color (e.g., green) associated with archive collection 812, and control element 836 can be in a color (e.g., red) associated with trash collection 814. In the dormant state, the colors can be translucent or pale or otherwise adjusted such that the presented information for message 824b remains readable. In this example, center region 840 of message 824 does not change color, and the user can click on center region 840 to indicate that message 824b should be presented in right pane 842.

Figure 8B:
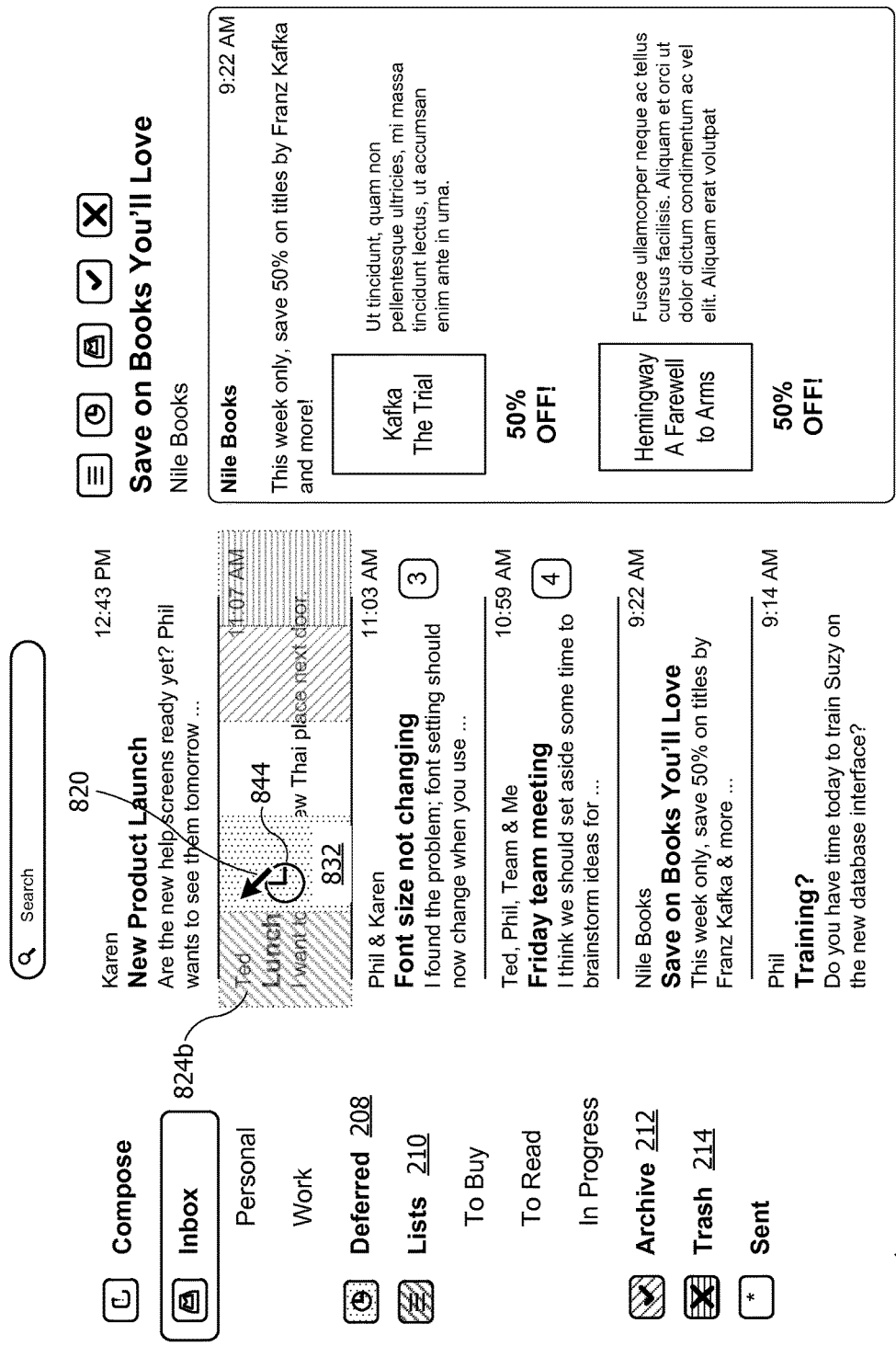

FIG. 8B shows screen 800 if the user moves cursor 820 over one of control elements 830, 832, 834, 836 of FIG. 8A. In this example, cursor 820 has been moved over control element 832, and control element 832 is now in an active state, indicating that the corresponding action will be performed if the user now clicks. For example, to indicate the active state, control element 832 can become opaque, and glyph 844 can appear to further indicate the action (in this case, message deferral) that will be performed if the user now clicks. Other control elements 830, 834, 836 can remain in the dormant state. If the user moves cursor 820 over another control element 830, 834, 836, that element can become active (e.g., opaque and displaying a glyph) while element 832 can return to its dormant state.

Figure 8C:
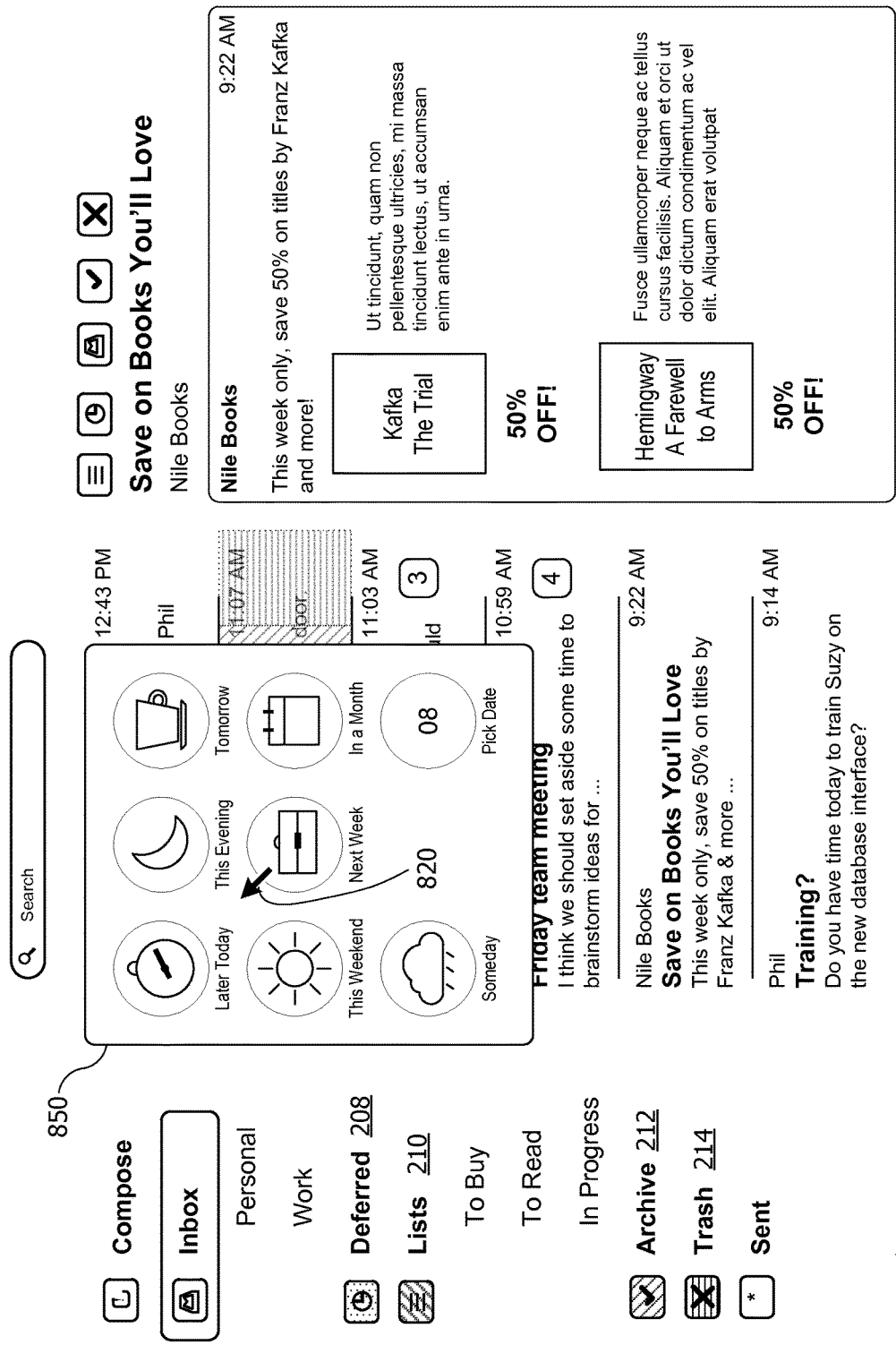

FIG. 8C shows screen 800 after the user clicks while cursor 820 is positioned over control element 832, indicating that message 824b should be deferred. A deferral menu 850 can be presented. Deferral menu 850 can be similar to deferral menu 520 of FIG. 5B and can appear in a position determined based on the current location of cursor 820. The user can operate cursor 820 to select a deferral option from menu 850.

Figure 8D:
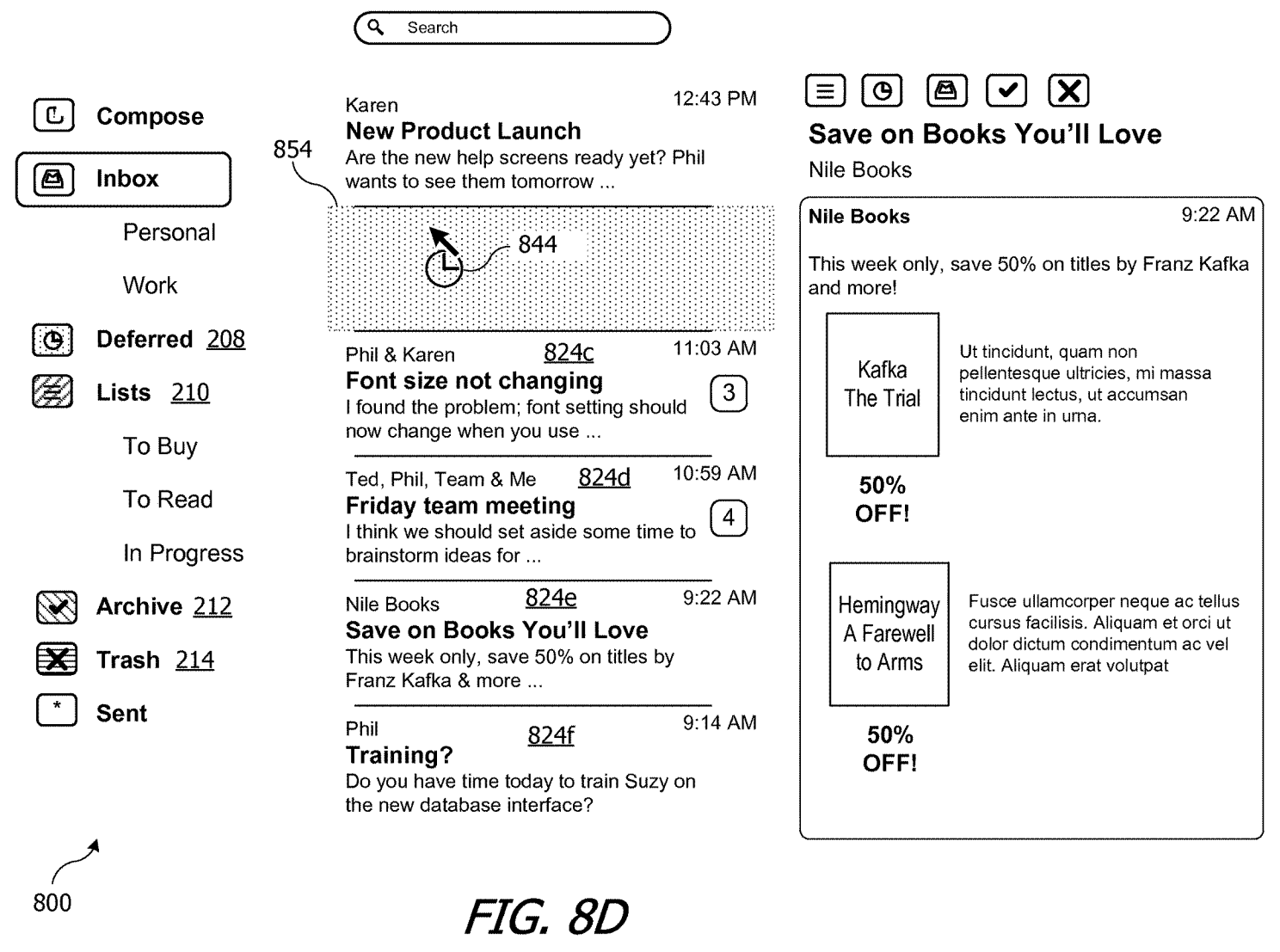
Figure 8E:
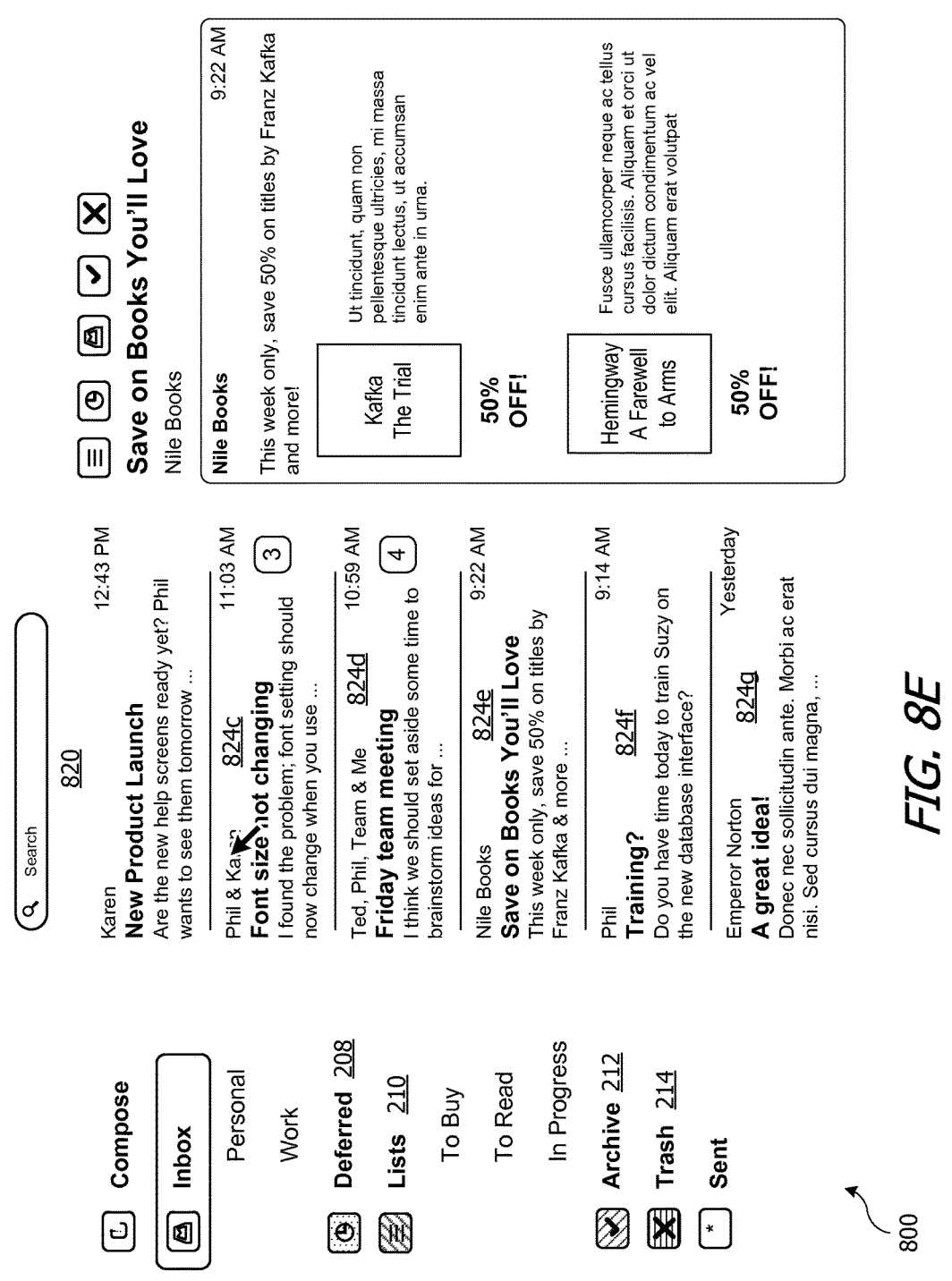

In some embodiments, an animated transition can be used to indicate moving a message to another collection. FIG. 8D shows screen 800 after the user selects a deferral option from menu 850 of FIG. 8B. Menu 850 can disappear, and the area occupied by message 824b can be filled with region 854 in a color corresponding to the deferral action (e.g., yellow). Deferral glyph 844 can reappear, and in some embodiments, the filling of region 854 with color can be animated as the color expanding outward from the region previously occupied by selected control element 832. After region 854 becomes filled with color, messages 824c-824f can move up to fill the space formerly occupied by message 824b, as shown in FIG. 8E. If the current collection contains additional messages not visible in FIG. 8D, another message 824g can appear at the bottom of the list in center pane 820.

It is to be understood that, from the configuration of FIG. 8A, the user can select any of control elements 830, 832, 834, 836, and an animated transition similar to that shown in FIGS. 8D and 8E can be performed. In the case where the user selects control element 830 to move a message to lists collection 210, the user can be prompted to select a specific list 211, e.g., using a selection menu similar to selection menu 620 of FIG. 6B.

Figure 9:
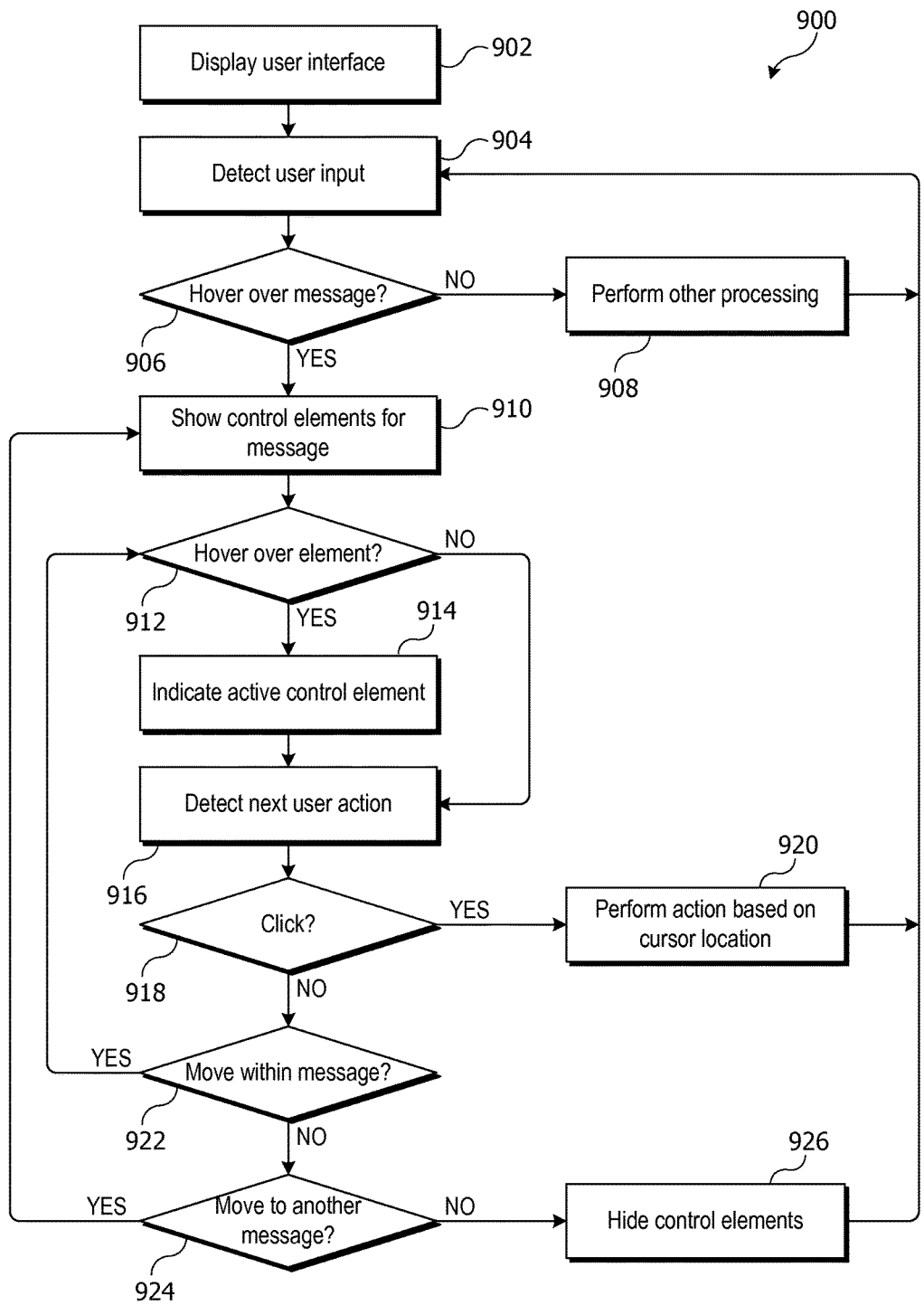
FIG. 9 is a flow diagram of a process for message processing according to an embodiment of the present invention.

FIG. 9 is a flow diagram of a process 900 for message processing according to an embodiment of the present invention. Process 900 can be implemented in a client device, e.g., client 110 of FIG. 1 using interface screens similar to those of FIGS. 8A-8E.

At block 902, client 110 can display a user interface, e.g., interface screen 800 of FIG. 8A. At block 904, client 110 can receive user input. The user input at any given time can include, for example, cursor movement, clicking, and/or hovering. Client 110 can take action based on the input and return to block 904 to receive further input.

More specifically, at block 906, client 110 can determine whether the user input corresponds to hovering over a message in a message list. For example, if cursor 820 is positioned over a message in center pane 822 and no control button is currently activated, this can be detected as hovering. In some embodiments, detecting hovering can further require that cursor 820 is not moving. When hovering over a message in a message list is not detected, at block 908, client 110 can perform appropriate input processing based on the user input received. Depending on the specific user input and implementation, such processing can include changing the current message collection displayed in center pane 820, moving a message to a collection based on user operation of control elements 850 in right pane 842 of FIG. 8A, opening a window or pane for the user to compose a message, and so on. It is to be understood that any type of input processing can occur at block 908.

If, at block 906, cursor 820 is hovering over a message, then at block 910, client 110 can show a control menu including control elements for acting on the message over which cursor 820 is hovering. For instance, as shown in FIG. 8A, client 110 can display control elements 830, 832, 834, 836. All control elements can initially be displayed in the dormant state (e.g., translucent). If, at block 912, cursor 820 is hovering over a displayed control element, then at block 914, client 110 can modify the display of that control element to indicate that it is active (i.e., the action corresponding to the control element will be performed if the user clicks with cursor 820 in its current location). For instance, as shown in FIG. 8B, client 110 can render active control element 832 as opaque while other control elements remain translucent.

At block 916, client 110 can detect a next user action. At block 918, if the user clicks a control button, then at block 920, client 110 can perform an action based on the cursor location. For example, if the user clicks while cursor 820 is positioned within control element 832 shown in FIG. 8B, client 110 can move message 824b to the deferred collection. If the user clicks while cursor 820 is positioned within a different control element, the corresponding action can be performed. For instance, clicking while cursor 820 is within control element 830 can result in moving the message to lists collection 810; clicking while cursor 820 is within control element 834 can result in moving the message to archive collection 812; and clicking while cursor 820 is within control element 836 can result in moving the message to trash collection 814. If cursor 820 is not within any control element when the user clicks, a different action can be performed at block 920. For instance, if the user clicks while cursor 820 is within center region 840 (shown in FIG. 8A), the action taken can include displaying message 824b in right pane 842.

If the action taken at block 916 is not a click, then at block 922, client 110 can determine whether the action corresponds to moving cursor 820 within the region occupied by the current message. If so, control elements for the message can continue to be displayed, and process 900 can return to block 912 to update the active control element. If, at block 924, cursor 820 has moved to a different message in the message list, process 900 can return to block 910 to display control elements for the message where cursor 820 is now positioned; control elements for the previous message can become hidden (e.g., not rendered on the display screen). If cursor 820 has moved out of the message list entirely (i.e., cursor 820 did not stay within the same message at block 922 and did not move onto another message in the message list at block 924), then at block 926, the control elements that were presented starting at block 910 can be hidden, and process 900 can return to block 904 to detect and process the user input.

It will be appreciated that the process 900 is illustrative and that variations and modifications are possible. Steps described as sequential may be executed in parallel, order of steps may be varied, and steps may be modified, combined, added or omitted. For instance, the set of available actions can include more actions, fewer actions, or different actions. Further, the set of control elements and their arrangement can depend on which collection is the current message collection displayed in center pane 820. The particular definition of user actions corresponding to hovering and clicking can be modified as desired, based on the particular user input device(s) available.

The style in which control elements are rendered in active and dormant states can also be modified. FIGS. 10A-16 show additional examples of control elements according to embodiments of the present invention. Those skilled in the art will appreciate that other styles can be implemented.

FIG. 10A shows a user interface screen 1000 according to another embodiment of the present invention. Screen 1000 can be similar to screen 200 of FIG. 2, and center pane 1022 and cursor 1020 can be similar to center pane 222 and cursor 220. In this example, each message has a dormant control menu 1030 positioned at the right end of the message area. In one alternative embodiment, dormant control menu 1030 can be positioned at the left end.

Figure 10B:
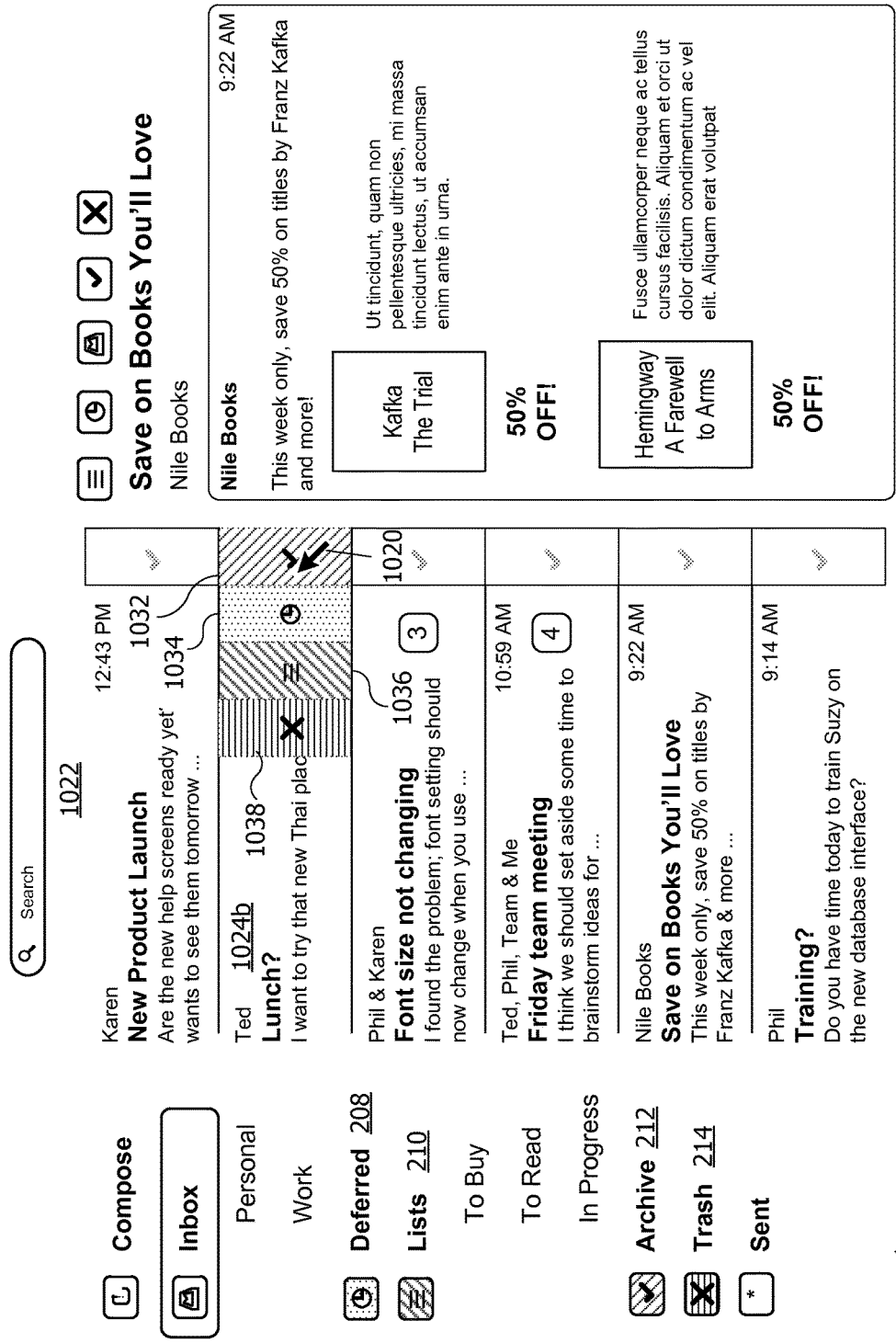

FIG. 10B shows screen 1000 after the user moves cursor 1020 onto dormant control menu 1030 next to message 1024b. In this example, control menu 1030 can enter an active state in which control elements 1032, 1034, 1036, 1038 are presented, e.g., as popping out of dormant control menu 1030. As shown, control elements 1032, 1034, 1036, 1038 can extend over and partially obscure portions of message 1024b. Each of control elements 1032, 1034, 1036, 1038 can correspond to a different user action, such as moving a message to a different collection. As in other examples herein, control elements 1032, 1034, 1036, 1038 can use color-coding and/or glyphs to indicate the corresponding collection. In this example, control element 1032 corresponds to archive collection 212, control element 1034 to deferred collection 208, control element 1036 to lists collection 210, and control element 1036 to trash collection 214. In some embodiments, the appearance of control elements 1032, 1034, 1036, 1038 can be animated, e.g., such that they appear to emerge from dormant control menu 1030 of FIG. 10A and expand leftward across the message. The user can move cursor 1020 onto any of control elements 1032, 1034, 1036, 1038 and select the corresponding action, e.g., by clicking an input button. The action can be performed, and a visual animation similar to animations described above can be performed to indicate the action. If the user moves cursor 1020 off message 1024b without selecting an action, control elements 1032, 1034, 1036, 1038 can make an animated transition back to the dormant state, e.g., appearing to retreat into dormant control menu 1030 of FIG. 10A.

Figure 10C:
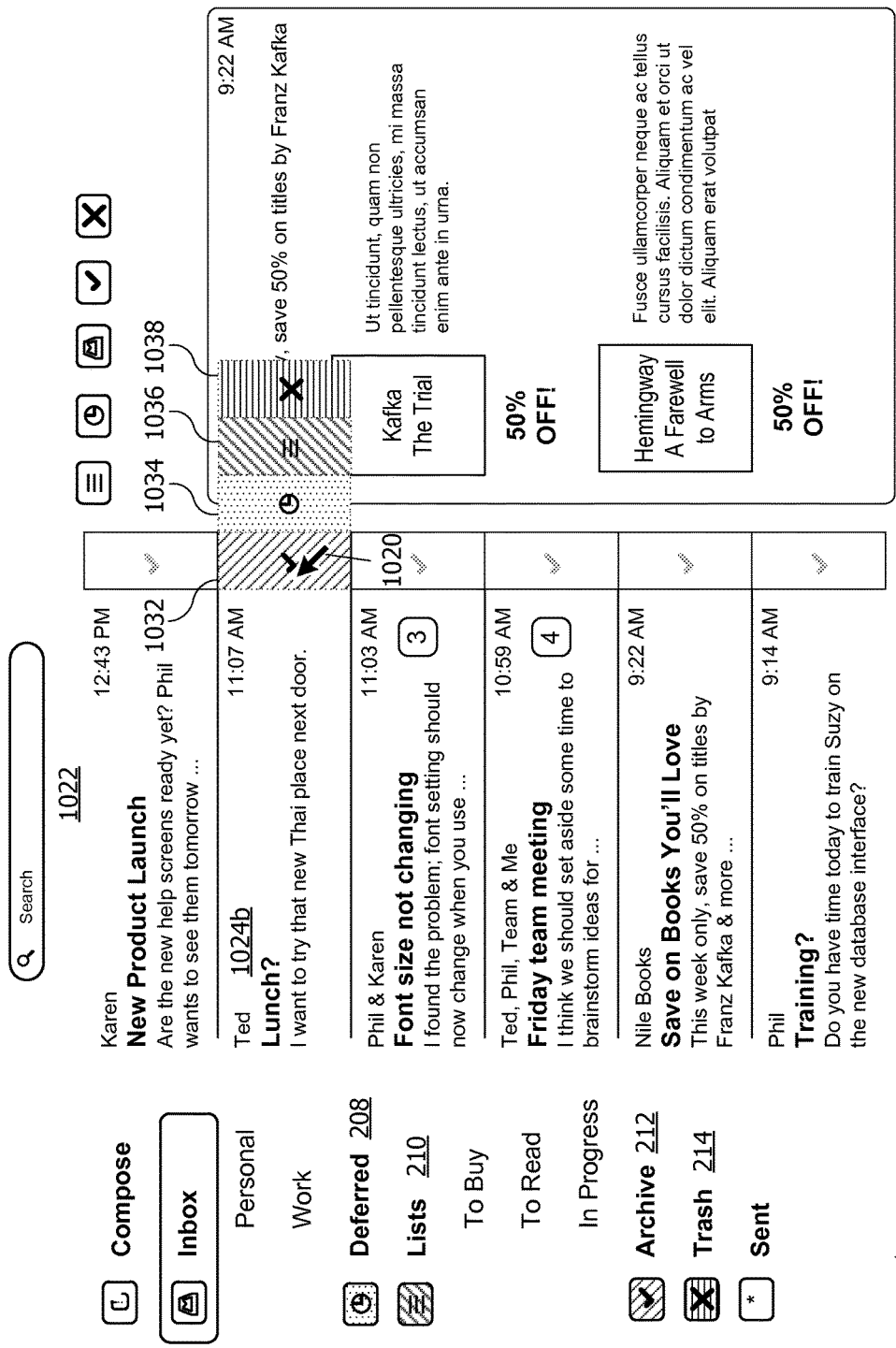

FIG. 10C shows an alternative implementation to FIG. 10B, in which control elements 1032, 1034, 1036, 1038 are deployed to extend outward to the right from dormant control menu 1030, rather than obscuring message 1024b.

In another arrangement, control elements can extend downward from a message to be acted upon. FIG. 11 shows a user interface screen 1100 according to another embodiment of the present invention. Screen 1100 can be similar to screen 200 of FIG. 2, and center pane 1122 and cursor 1120 can be similar to center pane 222 and cursor 220. In this example, when the user hovers cursor 1120 over message 1124b, a control menu including control elements 1132, 1134, 1136, 1138 can appear below message 1124b. As in other examples herein, control elements 1132, 1134, 1136, 1138 can use color-coding and/or glyphs to indicate the corresponding action. Thus, control element 1132 can correspond to moving message 1124b to lists collection 210; control element 1134 to deferred collection 208; control element 1136 to archive collection 212; and control element 1138 to trash collection 214. In this example, messages 1124c-e can move down to make space for control elements 1132, 1134, 1136, 1138, and the motion can be animated to make it clear that control elements 1132, 1134, 1136, 1138 provide options for acting on message 1124b (rather than, say, message 1124c). The user can move cursor 1120 onto any of control elements 1132, 1134, 1136, 1138. In some embodiments, the appearance of control elements 1132, 1134, 1136, 1138 can change as cursor 1120 moves onto or off of the element. For example, the active element can become larger or more brightly colored. While a control element is active, the user can select the corresponding action, e.g., by clicking an input button. The action can be performed, and a visual animation similar to animations described above can be performed to indicate the action. If the user moves cursor 1120 off message 1124b without selecting an action, control elements 1132, 1134, 1136, 1138 can disappear, and this transition can also be animated. For example, message 1124c can appear to slide up to hide control elements 1132, 1134, 1136, 1138.

Figure 12:
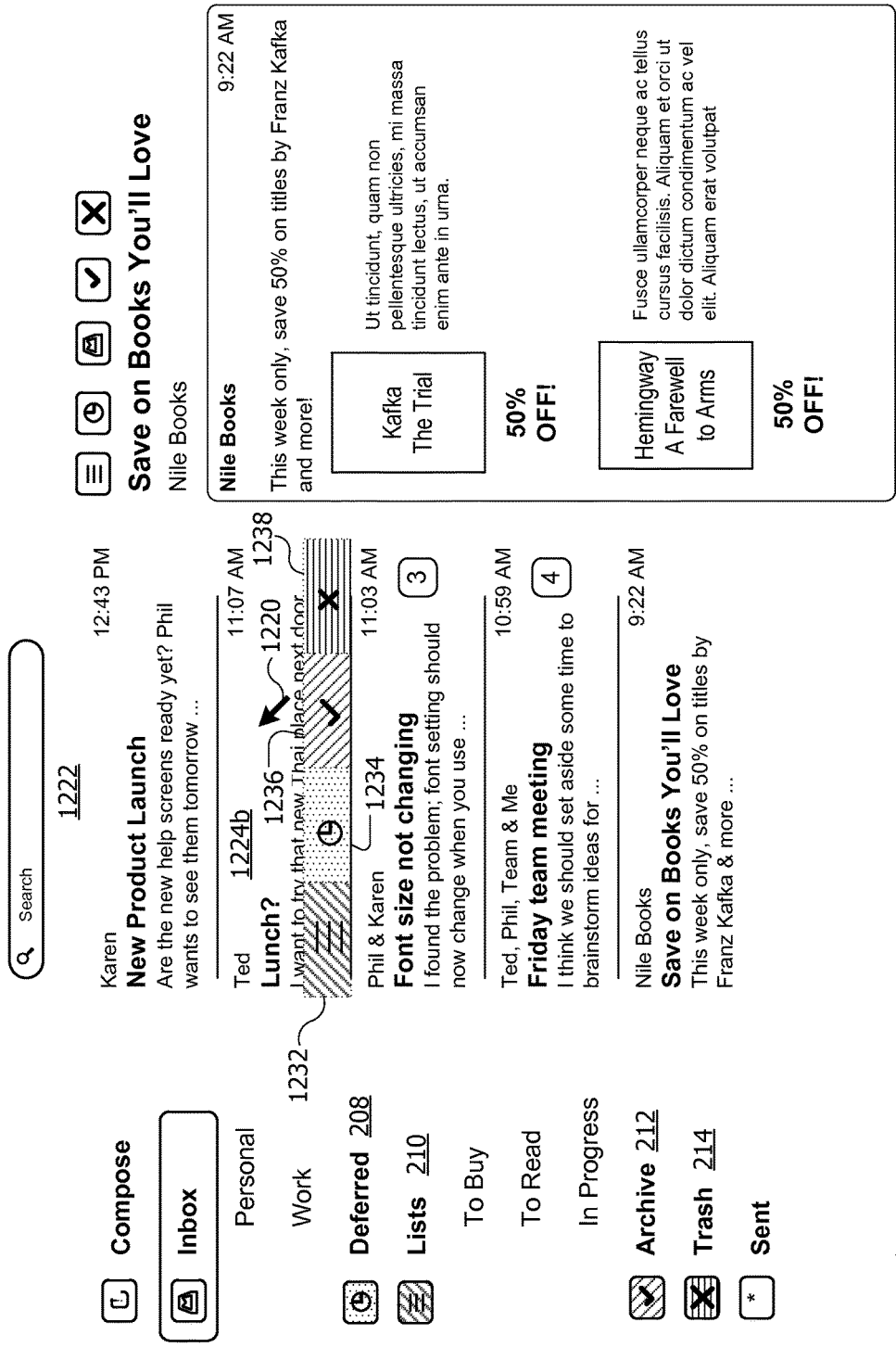
FIG. 12 shows a user interface screen according to another embodiment of the present invention.

In yet another arrangement, control elements can extend upward from the bottom of a message to be acted upon. FIG. 12 shows a user interface screen 1200 according to another embodiment of the present invention. Screen 1200 can be similar to screen 200 of FIG. 2, and center pane 1222 and cursor 1220 can be similar to center pane 222 and cursor 220. In this example, when the user hovers cursor 1220 over message 1224b, a control menu including control elements 1232, 1234, 1236, 1238 can appear at the bottom edge of message 1124b, obscuring part of the message information. As in other examples herein, control elements 1232, 1234, 1236, 1238 can use color-coding and/or glyphs to indicate the corresponding action, and, if desired, the appearance of control elements 1232, 1234, 1236, 1238 can change as cursor 1220 moves onto or off of the element. For example, the active element can become larger or more brightly colored. Thus, control element 1232 can correspond to moving message 1224b to lists collection 210; control element 1234 to deferred collection 208; control element 1236 to archive collection 212; and control element 1238 to trash collection 214. The appearance of control elements 1232, 1234, 1236, 1238 can be animated as the user moves cursor 1220 onto message 1224b, such that control elements 1232, 1234, 1236, 1238 appear to rise up from the bottom edge of message 1224b. The user can move cursor 1220 onto any of control elements 1232, 1234, 1236, 1238 and select the corresponding action, e.g., by clicking an input button. The action can be performed, and a visual animation similar to animations described above can be provided to indicate the action. If the user moves cursor 1220 off message 1224b without selecting an action, control elements 1232, 1234, 1236, 1238 can be animated to appear to sink back into the bottom edge of message 1224b, revealing the obscured portion of the message information.

Figure 13A:
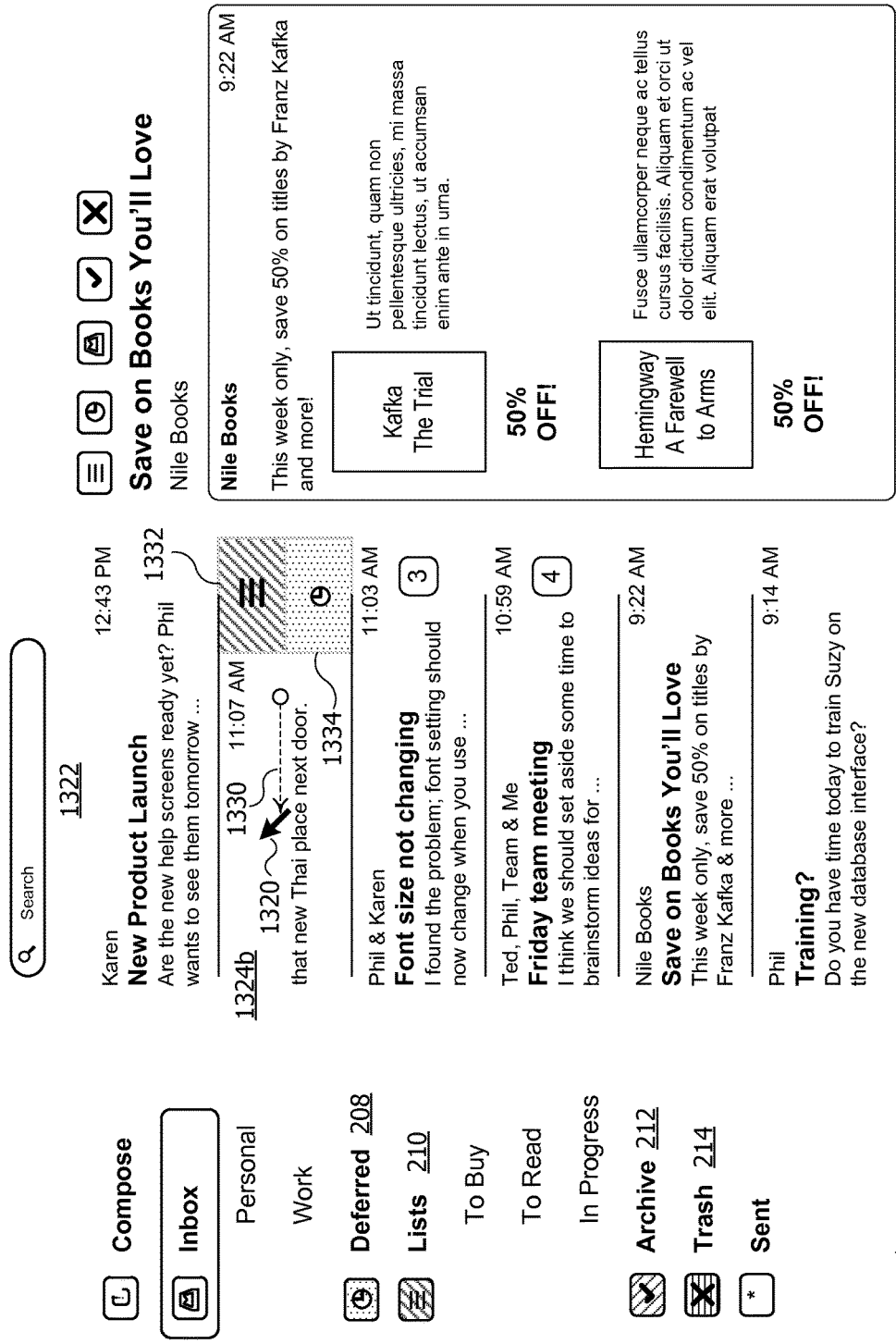
FIGS. 13A-13B show examples of user interactions with a user interface screen according to another embodiment of the present invention.
Figure 13B:
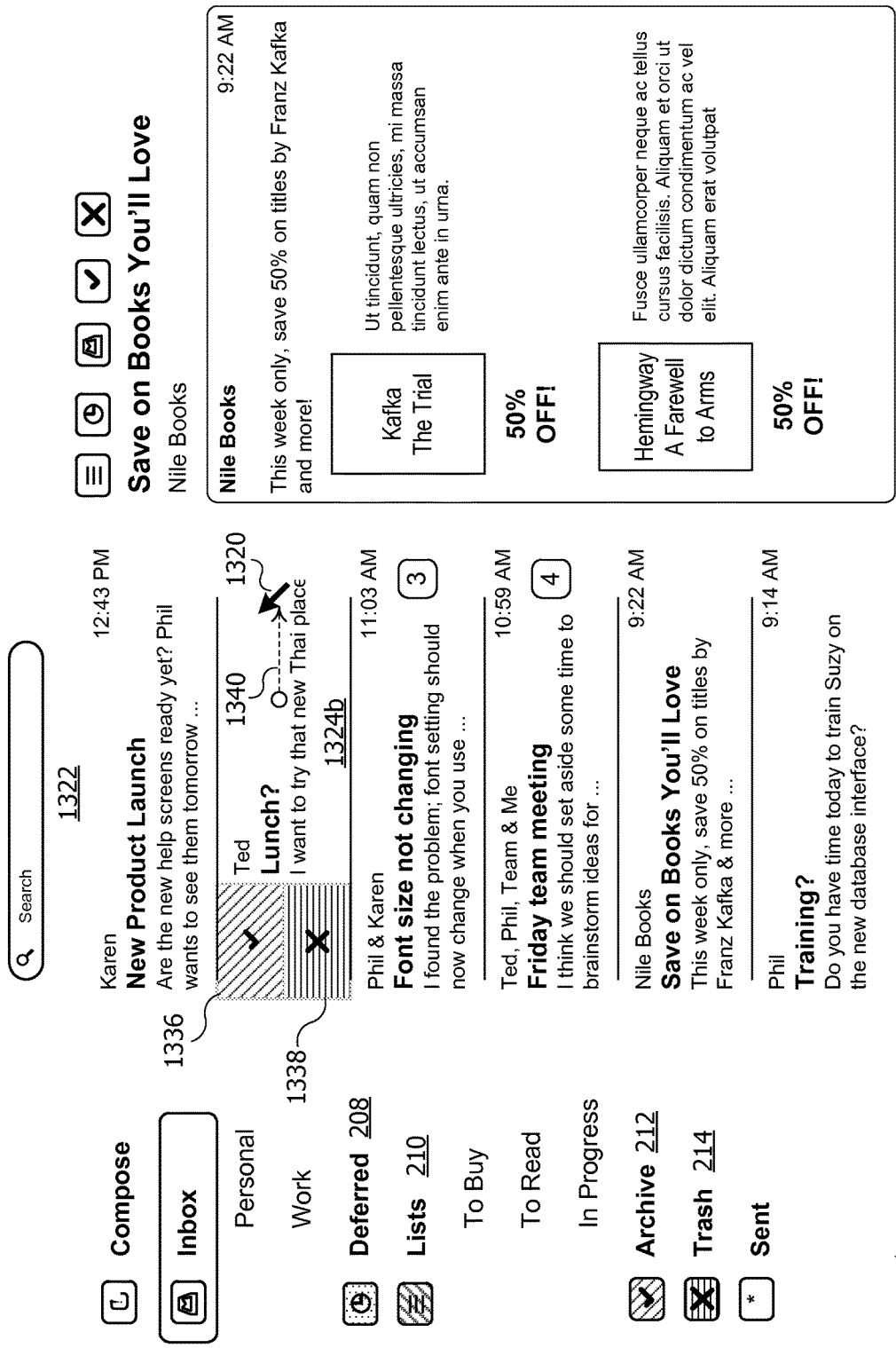

In yet another arrangement, a user can drag a message to reveal a control menu, then select a control element from the revealed menu. FIGS. 13A and 13B show a user interface screen 1300 according to another embodiment of the present invention. Screen 1300 can be similar to screen 200 of FIG. 2, and center pane 1322 and cursor 1320 can be similar to center pane 222 and cursor 220. In this example, if the user drags cursor 1320 to the left, as shown in FIG. 13A by dotted arrow 1330 message 1324b can appear to move to the left with cursor 1320, revealing control elements 1332, 1334. If the user drags cursor 1330 to the right, as shown in FIG. 13B by dotted arrow 1340, message 1324b can appear to move to the right with cursor 1320, revealing control elements 1336, 1338. As in other examples herein, control elements 1332, 1334, 1336, 1338 can use color-coding and/or glyphs to indicate the corresponding action. Thus, control element 1332 can correspond to moving message 1324b to lists collection 210; control element 1334 to deferred collection 208; control element 1336 to archive collection 212; and control element 1338 to trash collection 214. The appearance of control elements 1332, 1334 (or control elements 1336, 1338) can be animated as the user moves message 1324b to the left (or right). Once control elements 1332, 1334 (or 1336, 1338) have appeared, the user can move cursor 1320 over a control element (which, in some embodiments, can result in visual feedback indicating that the control element is now active) and select the corresponding action by clicking. The selected action can be performed, and a visual animation similar to animations described above can be provided to indicate the action. If the user moves cursor 1320 off message 1324b without selecting an action, message 1324b can move back into its centered position, hiding whichever of control elements 1332, 1334, 1336, 1338 were visible.

Other similar arrangements can also be provided. For instance, all control elements can appear with motion in the same direction, and control elements can be arranged side-by-side (similar to FIG. 10B) rather than being stacked as shown in FIGS. 13A and 13B.

Figure 14A:
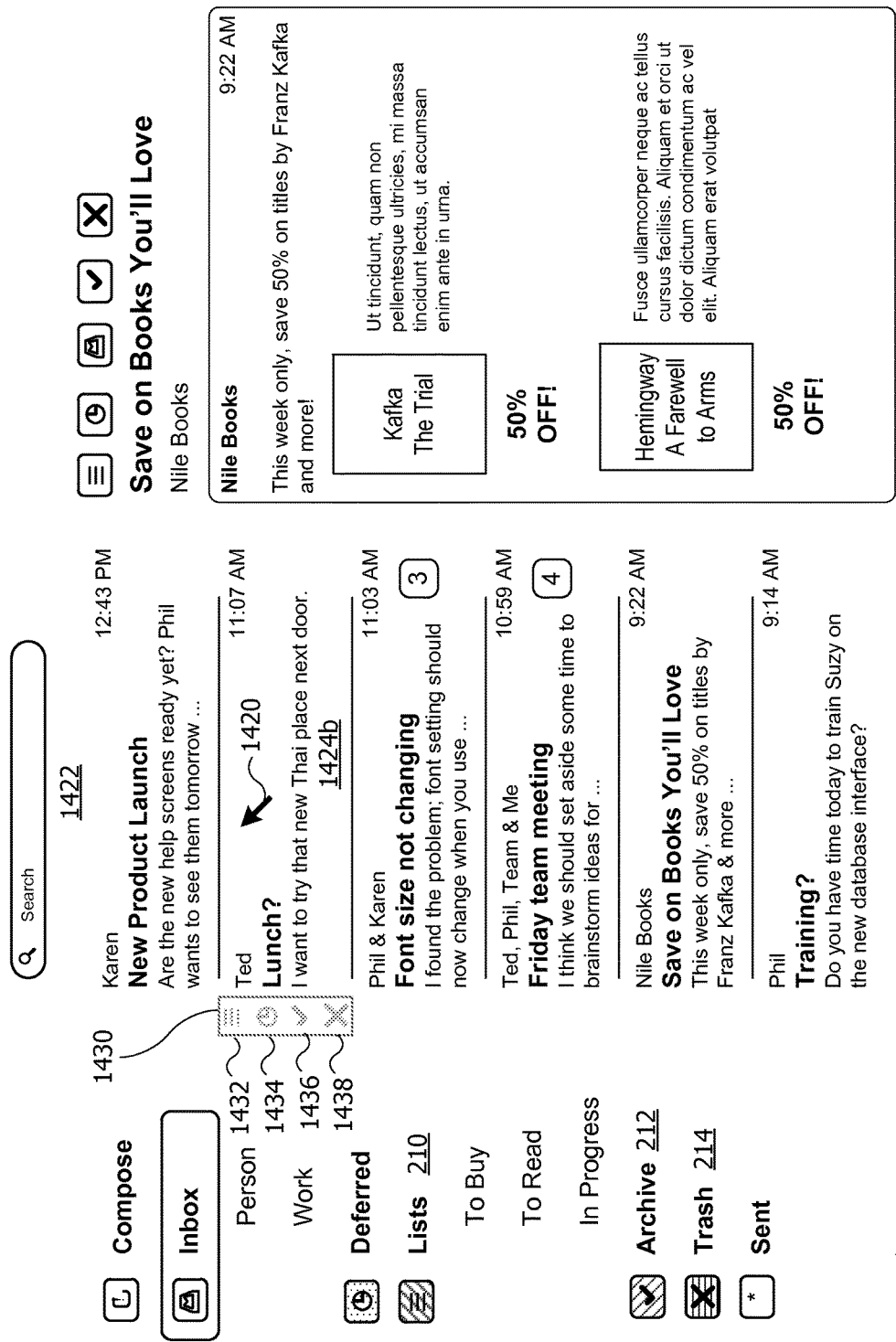
FIGS. 14A-14C show examples of user interactions with a user interface screen according to another embodiment of the present invention.
Figure 14B:
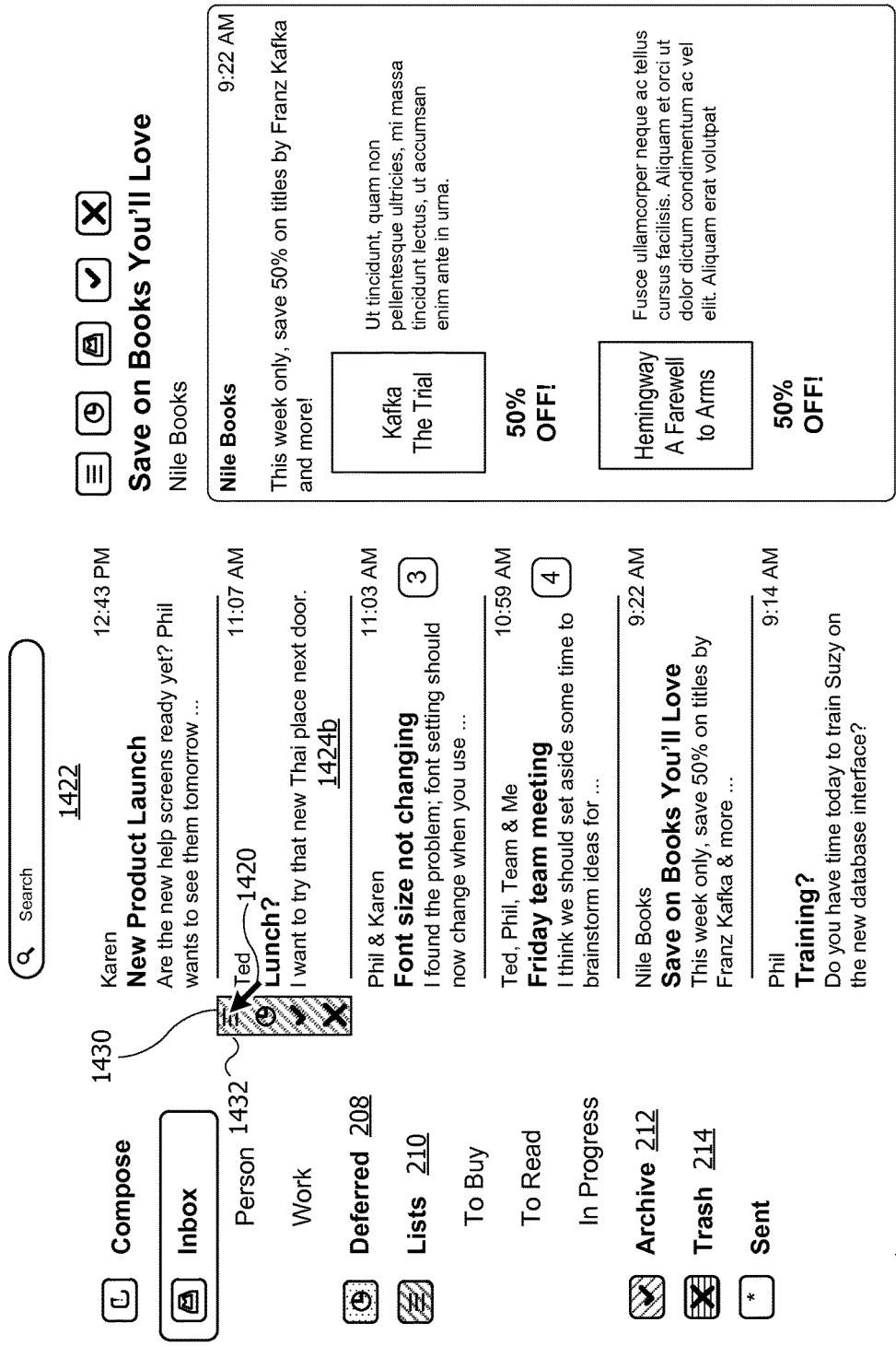
Figure 14C:
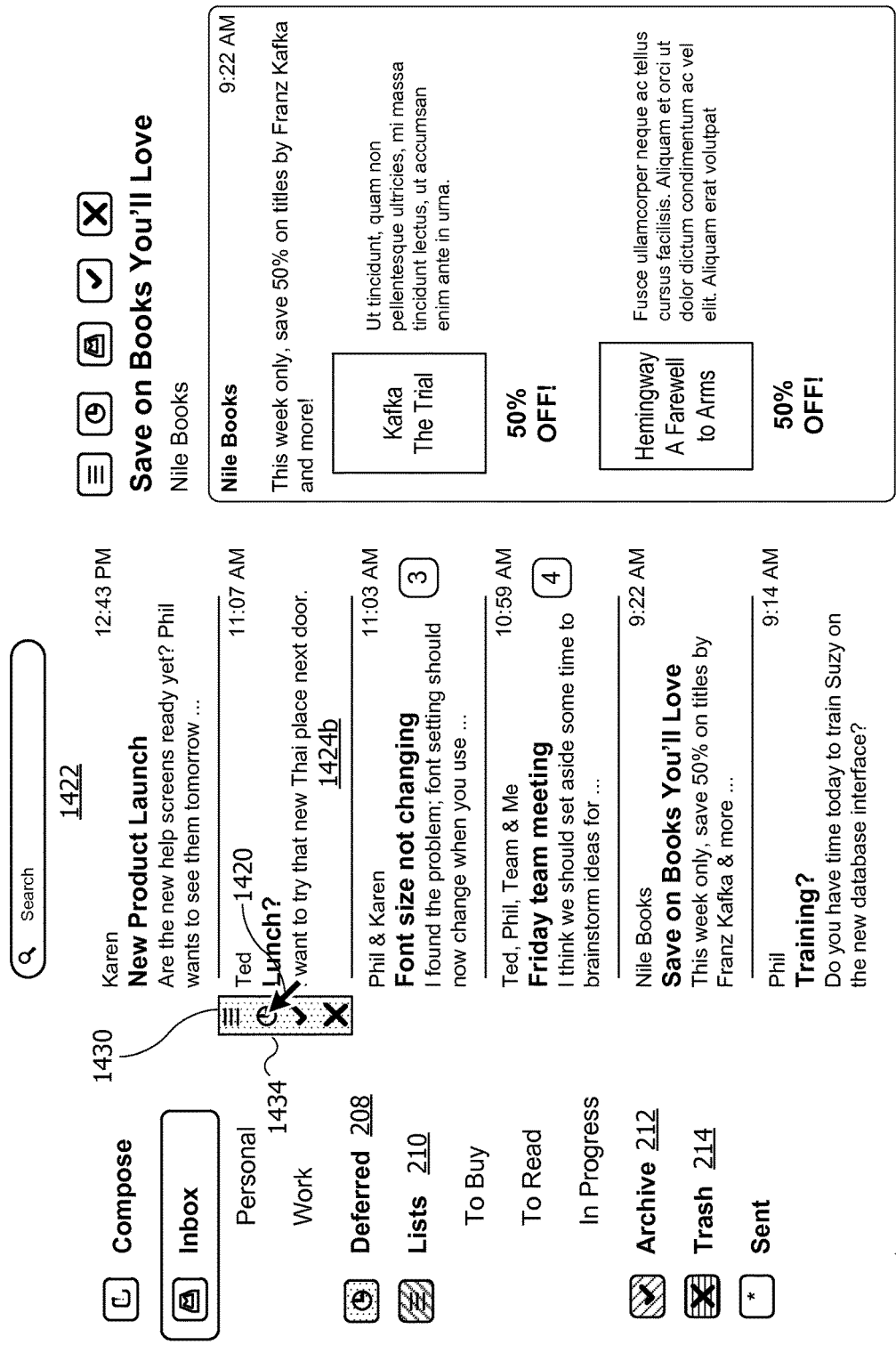

In yet another arrangement, a control menu can appear in a dormant state when the user hovers a cursor over a message and become active when the user moves the cursor over the menu. FIGS. 14A-14C show a user interface screen 1400 according to another embodiment of the present invention. Screen 1400 can be similar to screen 200 of FIG. 2, and center pane 1422 and cursor 1420 can be similar to center pane 222 and cursor 220. As shown in FIG. 14A, while cursor 1420 is on message 1424*b*, a dormant control menu 1430 can appear to the left of message 1424*b*. Control menu 1430 can include glyphs 1432, 1434, 1436, 1438 corresponding to various actions the user can perform on message 1424*b*. For instance, glyph 1432 can correspond to moving message 1424*b* to lists collection 210, glyph 1434 to deferred collection 208, glyph 1436 to archive collection 212, and glyph 1438 to trash collection 214.

FIG. 14B shows screen 1400 after the user moves cursor 1420 over control menu 1430. Control menu 1430 can transition from a dormant state to an active state. For example, the color of control menu 1430 can change from a neutral color (e.g., white as in FIG. 14A) to a color based on the particular location of cursor 1420 within control menu 1430. For instance, in FIG. 14B, cursor 1420 is positioned over glyph 1432, which corresponds to lists collection 210, and the color of control menu 1430 can be changed to a color associated with lists collection 210 (e.g., brown). As shown in FIG. 14C, if the user moves cursor 1420 over glyph 1434, the color of control menu 1430 can be changed to a color associated with deferred collection 208 (e.g., yellow). Similarly, moving cursor 1420 over glyph 1436 or glyph 1438 of FIG. 14A can further change the color of control menu 1430. This can provide a clear visual confirmation of which action the user can select by clicking at any given time. In some embodiments, control area 1430 can be divided into sections, each of which corresponds to a different action, and the color of control menu 1430 can be determined based on which section cursor 1420 is currently on. Thus, it is not necessary for the user to place the cursor precisely on a glyph to select an action, and the color can reliably communicate the action that will be selected for any given cursor location. If the user selects an action by clicking while cursor 1420 is on control menu 1430, the action can be performed, and a visual animation similar to animations described above can be provided to indicate the action. If the user moves cursor 1420 off control menu 1430 without selecting an action, control menu 1430 can revert to the dormant state shown in FIG. 14A, and if the user moves cursor 1420 off message 1424*b*, control menu 1430 can disappear.

Figure 15A:
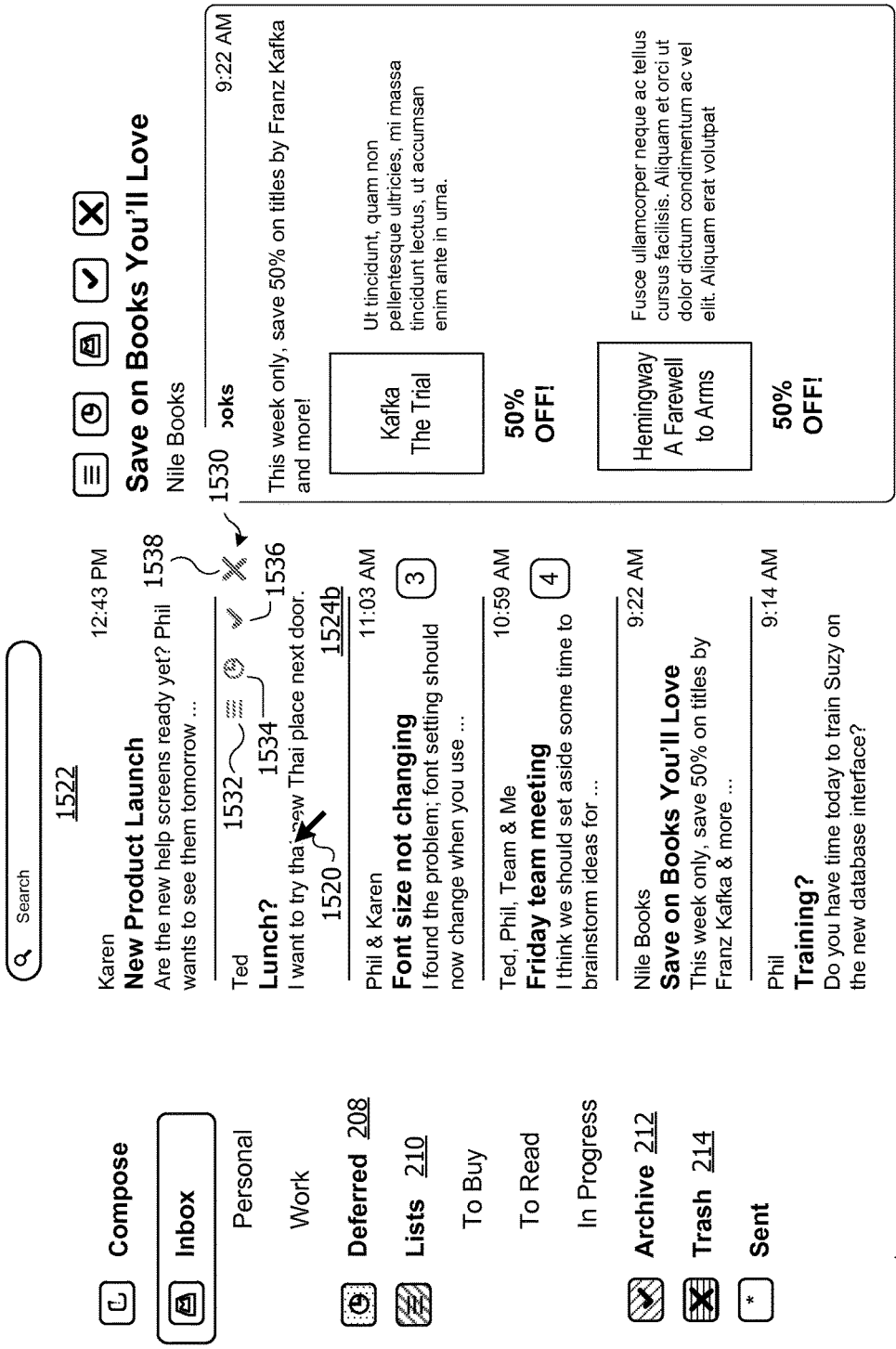

In other embodiments, a control menu can appear as an inset over a portion of message 1424*b*. For example, FIG. 15A shows a user interface screen 1500 according to another embodiment of the present invention. Screen 1500 can be similar to screen 200 of FIG. 2, and center pane 1522 and cursor 1520 can be similar to center pane 222 and cursor 220. As shown in FIG. 15A, while cursor 1520 is on message 1524*b*, a dormant control menu 1530 can appear in the upper right portion of message 1424*b* (in this case, obscuring a timestamp). Control menu 1530 can include glyphs 1532, 1534, 1536, 1538 corresponding to various actions the user can perform on message 1524*b*. For instance, glyph 1532 can correspond to moving message 1524*b* to lists collection 210, glyph 1534 to deferred collection 208, glyph 1536 to archive collection 212, and glyph 1538 to trash collection 214. Similarly to the embodiment shown in FIGS. 14A-14C, if the user moves cursor 1520 over control menu 1530, color-based feedback can be provided to indicate a specific selected action, based on where within menu 1530 the cursor is currently located.

Figure 15C:
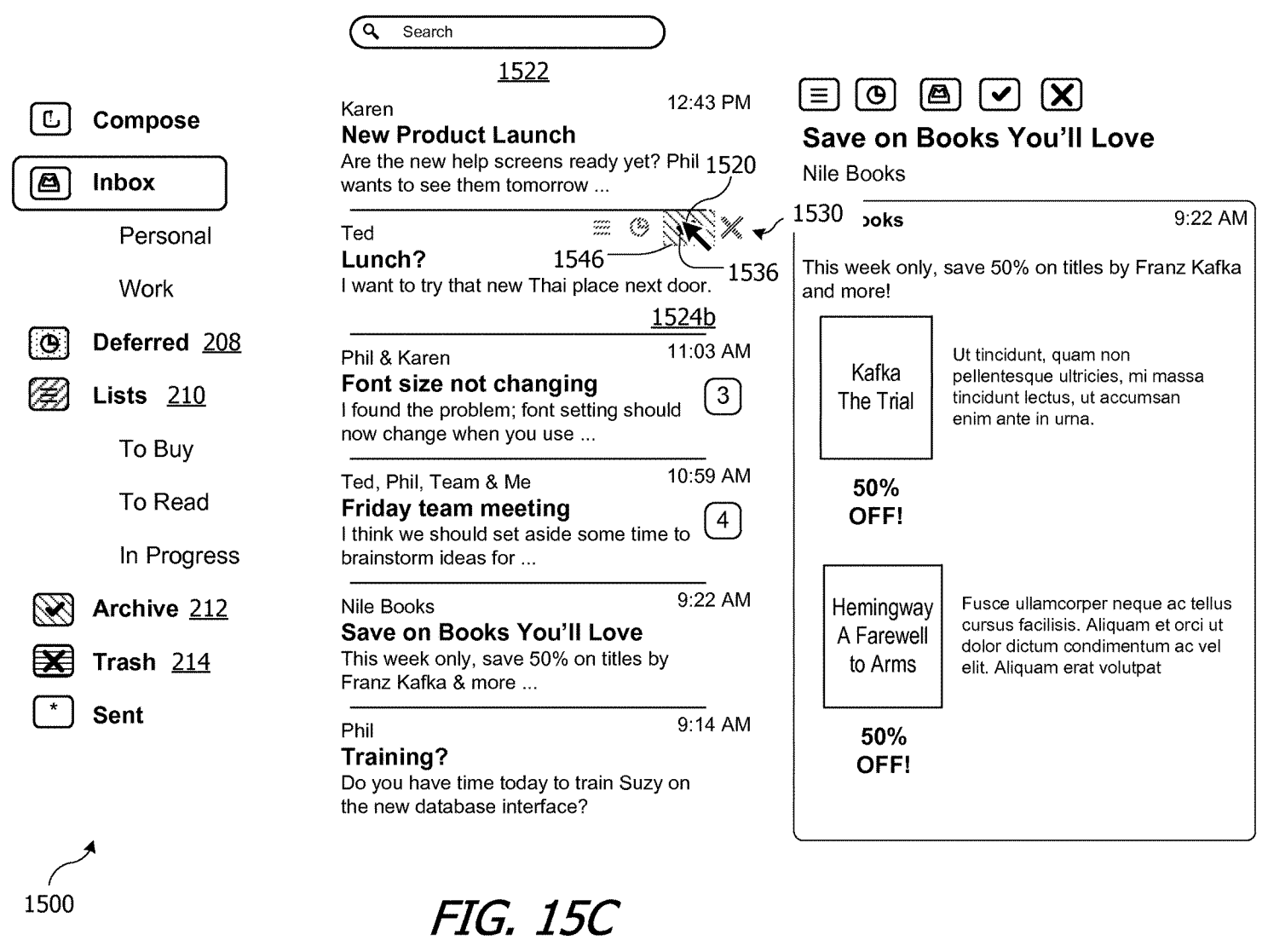
Figure 15D:
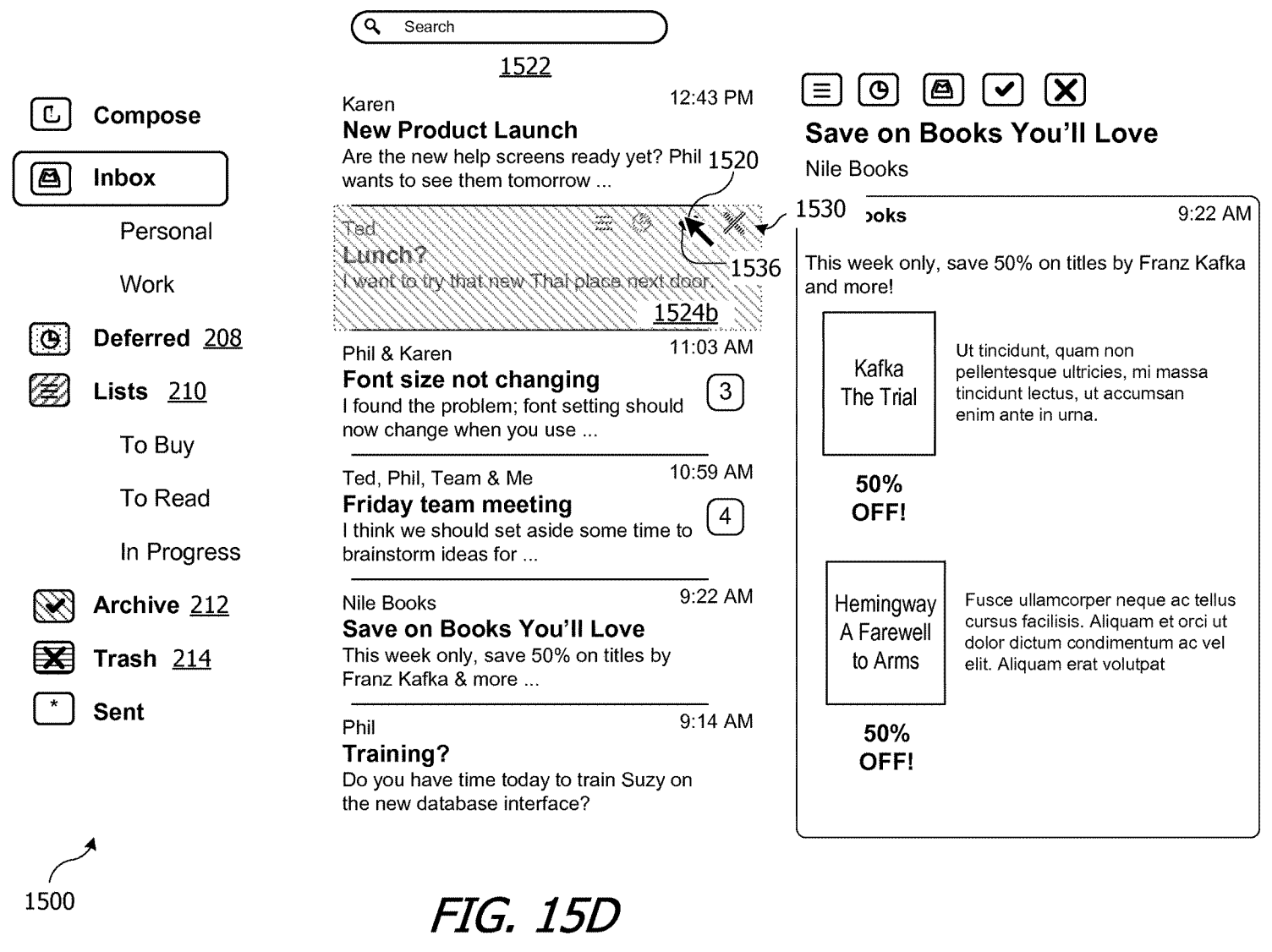

FIGS. 15B-15D show examples of various techniques for providing color-based feedback according to embodiments of the present invention. In FIG. 15B, control menu 1530 takes on a color based on the location of cursor 1520. In this case, cursor 1520 is on glyph 1536, and control menu 1530 can take on a color corresponding to archive collection 212 (e.g., green). Except for the location of control menu 1530, this can be similar to the embodiment shown in FIGS. 14A-14C.

FIG. 15C shows an alternative implementation in which only a portion of control menu 1530 takes on a color based on the location of cursor 1520. In this example, control menu 1530 can be divided into sections, each of which corresponds to a different action, and the color of the section of control menu 1530 within which cursor 1520 is located can be changed. As shown, cursor 1520 is on glyph 1536, and the section 1546 of control menu 1530 that corresponds to moving message 1524*b* to archive collection 212 is colored in a color corresponding to archive collection 212 (e.g., green). Other sections of control menu 1530 can remain in the neutral color (e.g., white), and if the user moves cursor 1520 off section 1546 without selecting the action, section 1546 can revert to the neutral color. If cursor 1520 moves into an adjacent section, that section can transition to its active-state color while section 1546 reverts to the neutral color.

FIG. 15D shows another alternative implementation in which the entire area of message 1424*b* takes on a translucent color based on the location of cursor 1520. In this example, control menu 1530 can be divided into sections, each of which corresponds to a different action, and the color of the area of message 1424*b* can be selected based on the section of control menu 1530 within which cursor 1520 is located. As shown, cursor 1520 is on glyph 1536, and accordingly, message 1424*b* is colored in a color corresponding to archive collection 212 (e.g., green). The color can be translucent so that message information is still visible. If the user moves cursor 1520 to a different glyph, the color of message 1424*b* can change to the color associated with that glyph (or with the message collection associated with the glyph). If the user moves cursor 1520 off control menu 1530 without selecting an action, message 1424*b* can revert to its neutral color, e.g., as shown in FIG. 15A.

In any of the examples in FIGS. 15A-15D, the user can select an action to perform by positioning cursor 1520 over the corresponding glyph (e.g., any of glyphs 1532, 1534, 1536, 1538) and clicking to select that action. If the user selects an action by clicking while cursor 1520 is on control menu 1530, the action can be performed, and a visual animation similar to animations described above can be provided to indicate performing the action.

A control menu similar to control menu 1430 of FIGS. 14A-14C or control menu 1530 of FIGS. 15A-15D can be positioned anywhere within or adjacent to the message to which the control menu pertains. FIG. 14A shows a control menu to the left of the message. The control menu can instead be placed to the right of the message, or above or below. By way of example, FIG. 16 shows a user interface screen 1600 according to another embodiment of the present invention. Screen 1600 can be similar to screen 200 of FIG. 2, and center pane 1622 and cursor 1620 can be similar to center pane 222 and cursor 220. As shown, when the user hovers cursor 1620 over message 1624*b*, a control menu 1630 can appear as a drop-down below message 1624*b*, possibly obscuring portions of message 1624*c*. Control menu 1630 can have behavior similar to control menu 1430 and/or control menu 1530 described above, with color-based feedback based on the location of cursor 1620 being used to identify the action that will be selected by clicking. Any portion (or all) of control menu 1630 and/or message 1624*b* can change color based on the location of cursor 1620.

In other embodiments, rather than extending outward, the control menu can appear as an inset. FIG. 15A shows one example of presenting a control menu as an inset at the top right of the message. Other inset positions can also be used. For example, the control menu can be placed to the right of the message, or as an inset at the top or bottom, in a corner or centered, or elsewhere as desired.

In embodiments where selection of a message and an action is based on a hover-and-click paradigm, color-based feedback cues can help reduce user errors. For example, in some of the examples shown in FIGS. 10A-16, the control element for a particular action may occupy a relatively small screen area. If a larger area changes color (e.g., as shown in any of FIG. 14B, 14C, 15B or 15D), the user can easily see the color and verify whether the color corresponds to the action the user desires.

Those skilled in the art with access to the present disclosure will recognize that other modifications are possible. Elements (including control elements and/or information elements) shown in different interface screens can be combined, and the arrangement of elements within an interface screen can modified. Elements can be different from the specific examples shown; for instance, all glyphs, colors, transitions, and the like are illustrative and not limiting. Further, the actions taken in response to user selection of a control element or user performance of a drag operation can include but are not limited to moving messages to various destination collections. For example, in some embodiments, the user may have the option to reply to or forward a message using control elements and operations similar to those described herein. All transitions can be animated, and the speed of animation can be as fast or slow as desired.

Figure 17:
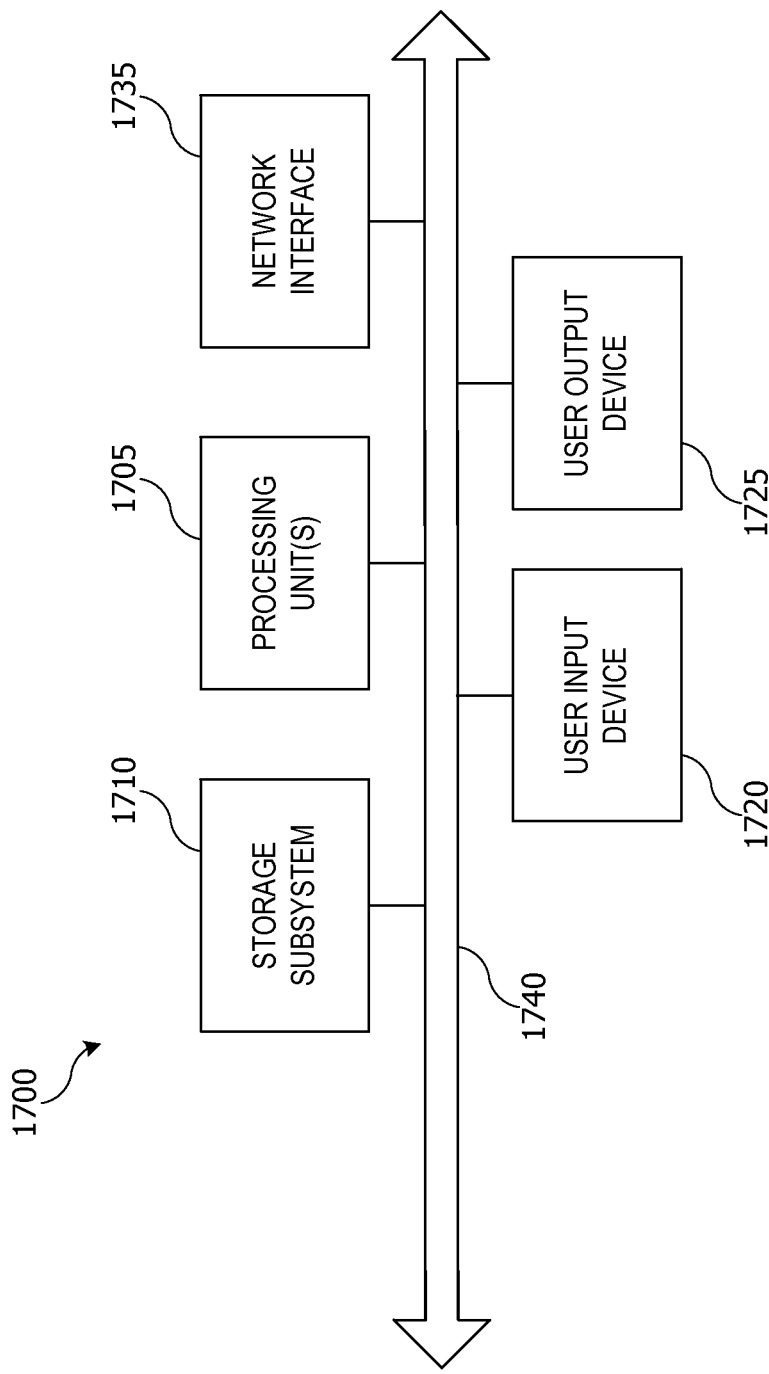
FIG. 17 shows a simplified block diagram of a representative computer system according to an embodiment of the present invention.

Various operations described herein can be implemented on computer systems, which can include systems of generally conventional design. FIG. 17 shows a simplified block diagram of a representative computer system 1700. In various embodiments, computer system 1700 or similar systems can implement a user device (e.g., any of clients 108, 110 of FIG. 1). Computer system 1700 can include processing unit(s) 1705, storage subsystem 1710, input devices 1720, output devices 1725, network interface 1735, and bus 1740.

Processing unit(s) 1705 can include a single processor, which can have one or more cores, or multiple processors. In some embodiments, processing unit(s) 1705 can include a general-purpose primary processor as well as one or more special-purpose co-processors such as graphics processors, digital signal processors, or the like. In some embodiments, some or all processing units 1705 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1705 can execute instructions stored in storage subsystem 1710.

Storage subsystem 1710 can include various memory units such as a system memory, a read-only memory (ROM), and a permanent storage device. The ROM can store static data and instructions that are needed by processing unit(s) 1705 and other modules of computer system 1700. The permanent storage device can be a read-and-write memory device. This permanent storage device can be a non-volatile memory unit that stores instructions and data even when computer system 1700 is powered down. Some embodiments of the invention can use a mass-storage device (such as a magnetic or optical disk or flash memory) as a permanent storage device. Other embodiments can use a removable storage device (e.g., a floppy disk, a flash drive) as a permanent storage device. The system memory can be a read-and-write memory device or a volatile read-and-write memory, such as dynamic random access memory. The system memory can store some or all of the instructions and data that processing unit(s) 1705 need at runtime.

Storage subsystem 1710 can include any combination of computer readable storage media including semiconductor memory chips of various types (DRAM, SRAM, SDRAM, flash memory, programmable read-only memory) and so on. Magnetic and/or optical disks can also be used. In some embodiments, storage subsystem 1710 can include removable storage media that can be readable and/or writeable; examples of such media include compact disc (CD), read-only digital versatile disc (e.g., DVD-ROM, dual-layer DVD-ROM), read-only and recordable Blue-Ray® disks, ultra density optical disks, flash memory cards (e.g., SD cards, mini-SD cards, micro-SD cards, etc.), magnetic disks, and so on. The computer readable storage media do not include carrier waves and transitory electronic signals passing wirelessly or over wired connections.

In some embodiments, storage subsystem 1710 can store one or more software programs to be executed by processing unit(s) 1705, such as an operating system, a messaging client application, and so on. "Software" refers generally to sequences of instructions that, when executed by processing unit(s) 1705, cause computer system 1700 to perform various operations, thus defining one or more specific machine implementations that execute and perform the operations of the software programs. The instructions can be stored as firmware residing in read-only memory and/or applications stored in non-volatile storage media that can be read into volatile working memory for execution by processing unit(s) 1705. Software can be implemented as a single program or a collection of separate programs or program modules that interact as desired. From storage subsystem 1710, processing unit(s) 1705 can retrieve program instructions to execute and data to process in order to execute various operations described herein.

A user interface can be provided by one or more user input devices 1720 and one or more user output devices 1725. Input devices 1720 can include any device via which a user can provide signals to computer system 1700; computer system 1700 can interpret the signals as indicative of particular user requests or information. In various embodiments, input devices 1720 can include any or all of a keyboard, track pad, touch screen, mouse or other pointing device, scroll wheel, click wheel, dial, button, switch, keypad, microphone, and so on.

User output devices 1725 can include any device via which computer system 1700 can provide information to a user. For example, user output devices 1725 can include a display to display images generated by computer system 1700. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1725 can be provided in addition to or instead of a display. Examples include indicator lights, speakers, tactile "display" devices, printers, and so on.

In some embodiments, input device 1720 and output devices 1725 can interoperate to provide a graphical user interface ("GUI") that allows a user to interact with computer system 1700 by using an input device to select a control element displayed on the screen (e.g., by operating a pointing device such as a mouse or touching the location where a control element is displayed on a touch screen).

Network interface 1735 can provide voice and/or data communication capability for computer system 1700, including the ability to communicate with various messaging services and/or message management services to access and act upon messages. In some embodiments, network interface 1735 can include radio frequency (RF) transceiver components for accessing wireless voice and/or data networks (e.g., using cellular telephone technology, advanced data network technology such as 3G, 4G or EDGE, Wi-Fi (IEEE 802.11 family standards), or other mobile communication technologies, or any combination thereof), GPS receiver components, and/or other components. In some embodiments, network interface 1735 can provide wired network connectivity (e.g., Ethernet) in addition to or instead of a wireless interface. Network interface 1735 can be implemented using a combination of hardware (e.g., antennas, modulators/demodulators, encoders/decoders, and other analog and/or digital signal processing circuits) and software components.

Bus 1740 can include various system, peripheral, and chipset buses that communicatively connect the numerous components of computer system 1700. For example, bus 1740 can communicatively couple processing unit(s) 1705 with storage subsystem 1710. Bus 1740 can also connect to input devices 1720 and output devices 1725. Bus 1740 can also couple computing system 1700 to a network through network interface 1735. In this manner, computer system 1700 can be a part of a network of multiple computer systems (e.g., a local area network (LAN), a wide area network (WAN), an intranet, or a network of networks, such as the Internet.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter.

Through suitable programming, processing unit(s) 1705 can provide various functionality for computer system 1700. For example, computer system 1700 can execute a messaging client app that provides an interface operable by the user to interact with messages, including, e.g., any or all of the interface screens described above.

It will be appreciated that computer system 1700 is illustrative and that variations and modifications are possible. Computer system 1700 can have other capabilities not specifically described here (e.g., mobile phone, global positioning system (GPS), power management, one or more cameras, various connection ports for connecting external devices or accessories, etc.). Further, while computer system 1700 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A computer-implemented method, comprising:
   presenting, at a user device, a user interface including a message-list pane that displays a list of messages, each message being associated with a control menu having a dormant state and an active state, the control menu including a set of control elements, each control element being different from another and corresponding to a different action that once selected can be applied to a respective message,
   receiving, by the user device, a selection of a first message from the list of messages;
   receiving, by the user device, a first input triggering a display of the control menu associated with the first message, wherein the control menu is positioned within a boundary occupied by the first message in the message-list pane and wherein the control menu is initially displayed in the dormant state, and wherein, in the dormant state, the set of control elements of the control menu are visible and non-actionable, with each control element translucently overlaying at least a portion of the first message while the portion of the first message remains visible;
   receiving a second user input to convert a control element of the set of control elements from the dormant state to the active state, wherein, in the active state, the control element of the set of control elements is actionable and the portion of the first message overlaid by the control element is no longer visible;

in response to the second user input, converting the control element from the dormant state to the active state;

receiving a third input corresponding to a selection of the control element from the set of control elements; and applying an action corresponding to the selected control element to the first message.

2. The computer-implemented method of claim 1, wherein the set of control elements is displayed entirely within the boundary of the first message.

3. The computer-implemented method of claim 1, wherein the set of control elements is displayed at least partially outside the boundary of the first message.

4. The computer-implemented method of claim 1, wherein the set of control elements corresponds to actions comprising list, defer, save, or delete.

5. The computer-implemented method of claim 1, wherein each control element of the set of control elements comprises a visual indicator or a text command.

6. The computer-implemented method of claim 1, wherein selecting the control element comprises moving a cursor over the control element.

7. The computer-implemented method of claim 1, wherein, in the dormant state, for each control element, a graphical element corresponding to the action associated with the control element is hidden and, wherein, in the active state, for each control element, the graphical element corresponding to the action associated with the control element is visible.

8. A non-transitory computer-readable medium including one or more sequences of instructions that, when executed by one or more processors, cause the one or more processors to perform operations comprising:

presenting, at a user device, a user interface including a message-list pane that displays a list of messages, each message being associated with a control menu having a dormant state and an active state, the control menu including a set of control elements, each control element being different from another and corresponding to a different action that once selected can be applied to a respective message, receiving, by the user device, a selection of a first message from the list of messages;

receiving, by the user device, a first input triggering a display of, the control menu associated with the first message, wherein the control menu is positioned within a boundary occupied by the first message in the message-list pane and wherein the control menu is initially displayed in the dormant state and wherein, in the dormant state, the set of control elements of the control menu are visible and non-actionable, with each control element translucently overlaying at least a portion of the first message while the portion of the first message remains visible;

receiving a second user input to convert a control element of the set of control elements from the dormant state to the active state, wherein, in the active state, the control element of the set of control elements is actionable and the portion of the first message overlaid by the control element is no longer visible;

in response to the second user input, converting the control element from the dormant state to the active state;

receiving a third input corresponding to a selection of the control element from the set of control elements; and applying an action corresponding to the selected control element to the first message.

9. The non-transitory computer-readable medium of claim 8, wherein the set of control elements is displayed entirely within the boundary of the first message.

10. The non-transitory computer-readable medium of claim 8, wherein the set of control elements is displayed at least partially outside the boundary of the first message.

11. The non-transitory computer-readable medium of claim 8, wherein the set of control elements corresponds to actions comprising list, defer, save, or delete.

12. The non-transitory computer-readable medium of claim 8, wherein each control element of the set of control elements comprises a visual indicator or a text command.

13. The non-transitory computer-readable medium of claim 8, wherein selecting the control element comprises moving a cursor over the control element.

14. A computer system comprising:

one or more processors; and a non-transitory computer-readable medium including one or more sequences of instructions that, when executed by the one or more processors, cause the one or more processors to perform operations comprising:

presenting, at a user device, a user interface including a message-list pane that displays a list of messages, each message being associated with a respective control menu having a dormant state and an active state, each control menu including a respective set of control elements, each control element being different from another and corresponding to a different action that once selected can be applied to a respective message, receiving, by the user device, a first input triggering a display of a first control menu at a first position visually corresponding to a first position of a first message, wherein the first control menu is initially displayed in the dormant state and wherein, in the dormant state, a first set of control elements of the first control menu are visible and non-actionable;

receiving, by the user device, a second input triggering a display of, a second control menu at a second position visually corresponding to a second position of a second message, wherein the second control menu is positioned within a boundary occupied by the second message in the message-list pane and wherein the second control menu is initially displayed in the dormant state and wherein, in the dormant state, a second set of control elements of the second control menu are visible and non-actionable, with each control element of the second set of control elements translucently overlaying at least a portion of the second message while the portion of the second message remains visible;

receiving a third user input to convert a control element of the second control menu from the dormant state to the active state, wherein, in the active state, the control element of the second set of control elements is actionable and the portion of the second message overlaid by the control element of the second set of control elements is no longer visible;

in response to the third user input, converting the control element of the second set of control elements from the dormant state to the active state;

receiving a fourth input corresponding to a selection of the control element from the second control menu; and applying an action corresponding to the selected control element to the second message.

15. The computer system of claim 14, wherein the first set of control elements or the second set of control elements is displayed entirely within the boundary of the first message or the second message, respectively.

16. The computer system of claim 14, wherein the first set of control elements or the second set of control elements is displayed at least partially outside the boundary of the first message or the second message, respectively.

17. The computer system of claim 14, wherein the first set of control elements or the second set of control elements corresponds to actions comprising list, defer, save, or delete.

18. The computer system of claim 14, wherein each control element of the first set of control elements or the second set of control elements comprises a visual indicator or a text command.

19. The computer system of claim 14, wherein selecting the control element comprises moving a cursor over the control element.

\* \* \* \* \*